(12) United States Patent
Carstensen et al.

(10) Patent No.: US 9,737,846 B2
(45) Date of Patent: Aug. 22, 2017

(54) ADSORBENT MATERIALS AND METHODS OF USE

(71) Applicants: Barbara Carstensen, Annandale, NJ (US); Daniel P. Leta, Flemington, NJ (US); Preeti Kamakoti, Summit, NJ (US); Peter Ravikovitch, Princeton, NJ (US); Joshua Varon, Monroe Township, NJ (US); Tilman Wolfram Beutel, Neshanic Station, NJ (US); Karl Gottlieb Strohmaier, Port Murray, NJ (US); Ivy Dawn Johnson, Lawrenceville, NJ (US); Harry W. Deckman, Clinton, NJ (US); Frank Cheng-Yu Wang, Annandale, NJ (US); Charanjit Singh Paur, Phillipsburg, NJ (US)

(72) Inventors: Barbara Carstensen, Annandale, NJ (US); Daniel P. Leta, Flemington, NJ (US); Preeti Kamakoti, Summit, NJ (US); Peter Ravikovitch, Princeton, NJ (US); Joshua Varon, Monroe Township, NJ (US); Tilman Wolfram Beutel, Neshanic Station, NJ (US); Karl Gottlieb Strohmaier, Port Murray, NJ (US); Ivy Dawn Johnson, Lawrenceville, NJ (US); Harry W. Deckman, Clinton, NJ (US); Frank Cheng-Yu Wang, Annandale, NJ (US); Charanjit Singh Paur, Phillipsburg, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 14/963,371

(22) Filed: Dec. 9, 2015

(65) Prior Publication Data
US 2016/0175759 A1 Jun. 23, 2016

Related U.S. Application Data

(60) Provisional application No. 62/096,123, filed on Dec. 23, 2014.

(51) Int. Cl.
*B01D 53/04* (2006.01)
*B01J 20/18* (2006.01)
(Continued)

(52) U.S. Cl.
CPC .......... *B01D 53/047* (2013.01); *B01D 53/02* (2013.01); *B01D 53/0462* (2013.01); *B01J 20/18* (2013.01);
(Continued)

(58) Field of Classification Search
CPC ...... B01D 53/02; B01D 53/04; B01D 53/047; B01D 53/0462; B01D 53/0476;
(Continued)

(56) References Cited

U.S. PATENT DOCUMENTS 3,702,886 A 11/1972 Argauer et al.
3,709,979 A 1/1973 Chu
(Continued)

FOREIGN PATENT DOCUMENTS

EP 1080771 A1 7/2001

OTHER PUBLICATIONS

PCT/US2015/064617 International Search Report and Written Opinion dated Apr. 8, 2016.
(Continued)

*Primary Examiner* — Frank Lawrence
(74) *Attorney, Agent, or Firm* — Andrew T. Ward

(57) ABSTRACT

Adsorbent materials comprising a core, for example CHA, and at least one coating, for example DDR, are provided (Continued)

herein. Adsorbent contactors and gas separation processes using the adsorbent materials are also provided herein.

31 Claims, 19 Drawing Sheets

(51) Int. Cl.
| | | |
|---|---|---|
| *B01D 53/047* | (2006.01) | |
| *B01J 20/28* | (2006.01) | |
| *B01D 53/02* | (2006.01) | |
| *B01J 20/32* | (2006.01) | |

(52) U.S. Cl.
CPC ....... *B01J 20/183* (2013.01); *B01J 20/28004* (2013.01); *B01J 20/28011* (2013.01); *B01J 20/28016* (2013.01); *B01J 20/3204* (2013.01); *B01J 20/3238* (2013.01); *B01J 20/3293* (2013.01); *B01D 2253/106* (2013.01); *B01D 2253/108* (2013.01); *B01D 2253/25* (2013.01); *B01D 2253/304* (2013.01); *B01D 2253/34* (2013.01); *B01D 2256/245* (2013.01); *B01D 2257/504* (2013.01); *Y02C 10/08* (2013.01)

(58) Field of Classification Search
CPC ........ B01D 2253/105; B01D 2253/108; B01D 2253/25; B01D 2253/304; B01D 2256/24; B01D 2256/245; B01D 2257/504; B01D 2257/702; B01J 20/18; B01J 20/183; B01J 20/28004; B01J 20/28011; B01J 20/28016; B01J 20/3204; B01J 20/3238; B01J 20/3293
USPC ........ 96/108, 121, 154; 95/90, 96, 117, 129, 95/130, 136, 137, 139; 423/230
See application file for complete search history.

(56) References Cited

U.S. PATENT DOCUMENTS

| | | | |
|---|---|---|---|
| 3,832,449 A | | 8/1974 | Rosinski et al. |
| 4,016,245 A | | 4/1977 | Plank et al. |
| 4,046,859 A | | 9/1977 | Plank et al. |
| 4,375,458 A | | 3/1983 | Dwyer et al. |
| 5,888,921 A | * | 3/1999 | Tsang .................... B01J 29/005 502/208 |
| 7,435,699 B2 | | 10/2008 | Jolimaitre et al. |
| 7,938,886 B2 | | 5/2011 | Hershkowitz et al. |
| 8,784,533 B2 | | 7/2014 | Leta et al. |
| 9,334,170 B2 | * | 5/2016 | Yilmaz .................. C01B 37/08 |
| 2002/0160905 A1 | * | 10/2002 | Loyalka ............... B01D 53/944 502/60 |
| 2005/0250641 A1 | | 11/2005 | Jolimaitre et al. |
| 2008/0282884 A1 | | 11/2008 | Kelley et al. |
| 2008/0282885 A1 | | 11/2008 | Deckman et al. |
| 2008/0282886 A1 | | 11/2008 | Reyes et al. |
| 2008/0282887 A1 | | 11/2008 | Chance et al. |
| 2008/0282892 A1 | | 11/2008 | Deckman et al. |
| 2011/0247495 A1 | | 10/2011 | Marco et al. |
| 2012/0222555 A1 | | 9/2012 | Gupta et al. |
| 2014/0060326 A1 | | 3/2014 | Sundaram |
| 2014/0256538 A1 | * | 9/2014 | Yoon ...................... C01B 37/02 502/67 |
| 2015/0182947 A1 | | 7/2015 | Johnson et al. |

OTHER PUBLICATIONS

Reyes et al., "Frequency Modulation Methods for Diffusion and Adsorption Measurements in Porous Solids", Journal of Physical Chemistry B 1997, pp. 614-622, vol. 101, Americal Chemical Society.

Brandani et al., "Analysis of ZLC Desorption Curves for Gaseous Systems" Adsorption, Jun. 1996, pp. 133-143, vol. 2, iss. 2, Springer.

Diaz-Cabanas et al., "Synthesis and structure of pure SiO2 chabazite: the SiO2 polymorph with the lowest framework density", Chemical Communications, 1998, pp. 1881-1882, iss. 17, Royal Society of Chemistry.

Exter et al., "Synthesis and characterization of the all-silica 8-ring Clathrasil DD3R comparison of adsorption properties with the hydrophilic zeolite A", Zeolites, 1997, pp. 353-358, vol. 19, iss. 5-6, Elsevier.

Gies, "Studies on clathrasils. IX Crystal structure of deca-dodecasil 3R, the missing link between zeolites and clathrasils", Zeitschrift für Kristallographie , Jan. 1986, pp. 93-104, vol. 175, iss. 1-2, Oldenbourg Verlag.

Gucuyener et al., "Facile synthesis of the DD3R zeolite: performance in the adsorptive separation of buta-1,3-diene and but-2-ene isomers", Journal of Materials Chemistry, 2011, pp. 18386-18397, vol. 21, Royal Society of Chemistry.

Potoff et al., "Vapor-Liquid Equilibria of Mixtures Containing Alkanes, Carbon Dioxide, and Nitrogen", AIChE Journal, Jul. 2001, pp. 1676-1682, vol. 47, No. 7.

Stewart et al., "Symthesis and characterisation of crystalline aluminosilicate sigma-1", Innovation in Zeolite Materials Science, pp. 57-64, Elsevier.

* cited by examiner

ADSORBENT MATERIALS AND METHODS OF USE

CROSS-REFERENCE TO RELATED APPLICATIONS

This application claims priority to U.S. Provisional Application Ser. No. 62/096,123 filed Dec. 23, 2014, herein incorporated by reference in its entirety.

FIELD

The present invention relates to an adsorbent material comprising a core and at least one coating. The core has an adsorption capacity for a gas contaminant, such as $CO_2$, greater than the coating, and the at least one coating has selectivity for the gas contaminant, such as $CO_2$, greater than the core.

BACKGROUND

Gas separation is important in many industries for removing undesirable contaminants from a gas stream and for achieving a desired gas composition. For example, natural gas from many gas fields can contain significant levels of $H_2O$, $SO_2$, $H_2S$, $CO_2$, $N_2$, mercaptans, and/or heavy hydrocarbons that have to be removed to various degrees before the gas can be transported to market. It is preferred that as much of the acid gases $H_2S$ and $CO_2$ be removed from natural gas as possible to leave methane as the recovered component. Small increases in recovery of methane can result in significant improvements in process economics and also serve to prevent unwanted resource loss. Ti is desirable to recover more than 80 vol %, particularly more than 90 vol %, of the methane when detrimental impurities are removed.

Additionally, synthesis gas (syngas) typically requires removal and separation of various components before it can be used in fuel, chemical and power applications because all of these applications have a specification of the exact composition of the syngas required for the process. As produced, syngas can contain at least CO and $H_2$. Other molecular components in syngas can be $CH_4$, $CO_2$, $H_2S$, $H_2O$, $N_2$, and combinations thereof. Minority (or trace) components in the gas can include hydrocarbons, $NO_3$, $NO_x$, and the like, and combinations thereof. In almost all applications, most of the $H_2S$ should typically be removed from the syngas before it can be used, and, in many applications, it can be desirable to remove much of the $CO_2$.

Adsorptive gas separation techniques are common in various industries using solid sorbent materials such as activated charcoal or a porous solid oxide such as alumina, silica-alumina, silica, or a crystalline zeolite. Adsorptive separation may be achieved by equilibrium or kinetic mechanisms. A large majority of processes operate through the equilibrium adsorption of the gas mixture where the adsorptive selectivity is primarily based upon differential equilibrium uptake of one or more species based on parameters such as pore size of the adsorbent. Kinetically based separation involves differences in the diffusion rates of different components of the gas mixture and allows different species to be separated regardless of similar equilibrium adsorption parameters.

Kinetically based separation processes may be operated as pressure swing adsorption (PSA), temperature swing adsorption (TSA), partial pressure swing or displacement purge adsorption (PPSA) or as hybrid processes comprised of components of several of these processes. These swing adsorption processes can be conducted with rapid cycles, in which case they are referred to as rapid cycle thermal swing adsorption (RCTSA), rapid cycle pressure swing adsorption (RCPSA), and rapid cycle partial pressure swing or displacement purge adsorption (RCPPSA) technologies, with the term "swing adsorption" taken to include all of these processes and combinations of them.

Typically, the zeolite adsorbents used in such gas separation processes either have good kinetic separation selectivity for the contaminant or high capacity for the contaminant, but not both. For example, the DDR zeolite, ZSM-58, which can be used to remove $CO_2$ from a natural gas stream, has a high $CO_2/CH_4$ kinetic separation selectivity but a lower $CO_2$ capacity. Thus, ZSM-58 is desirable for selectively separating $CO_2$ from $CH_4$ but is limited with regard to how much $CO_2$ can be adsorbed. Conversely, chabasite (CHA) has high $CO_2$ capacity and poor $CO_2/CH_4$ kinetic separation selectivity. Thus, while CHA can adsorb a large amount of $CO_2$, CHA is not as selective for $CO_2$ in the presence of $CH_4$ and will also adsorb $CH_4$.

U.S. Pat. No. 7,435,699 reports a non-homogeneous adsorbent with a core and at least one continuous outer layer in which the core has a volume adsorptive capacity of at least 35% of the volume of the adsorbent and the outer layer has a diffusional selectivity greater than 5.

U.S. Patent Publication No. 2012/0222555 reports a gas separation process using a structured particulate bed of adsorbent coated particles laid down in the bed in an ordered manner to simulate a monolith.

However, there is a need to provide additional adsorbent materials with both improved adsorption capacity and selectivity for a gas contaminant, such as $CO_2$, which can be used in various gas separation processes.

SUMMARY

It has been found that an adsorbent material with a high adsorption capacity and an increased selectivity for a gas contaminant, such as $CO_2$, can be achieved by providing an adsorbent material comprising a core and at least one coating grown on the core, wherein the core has an adsorption capacity for a gas contaminant, such as $CO_2$, greater than the coating, and the at least one coating has selectivity for the gas contaminant, such as $CO_2$, greater than the core.

Thus, in one aspect, embodiments of the invention provide an adsorbent material comprising a porous, solid core, wherein the core has a volume adsorptive capacity of less than 35% of the volume of the adsorbent material and at least one coating on the core, wherein the at least one coating has selectivity for $CO_2$ over $CH_4$ of greater than 100.

In still another aspect, embodiments of the invention provide an adsorbent material comprising a core comprising CHA and at least one coating on the core, wherein the coating comprises DDR.

In still another aspect, embodiments of the invention provide an adsorbent contactor for use in swing adsorption gas separation process units, comprising: a) a gas inlet end; and b) a gas outlet end; wherein the gas inlet end and the gas outlet end are in fluid connection by a plurality of open flow channels wherein the surface of the open flow channels are comprised of the adsorbent material described herein.

In still another aspect, embodiments of the invention provide a gas separation process comprising contacting a gas mixture containing at least one contaminant with the adsorbent material described herein.

In still another aspect, embodiments of the invention provide a process for selectively separating $CO_2$ from a feed gas mixture, the process comprising: a) contacting the feed gas mixture under sorption conditions with the adsorbent material described herein; b) sorbing the $CO_2$ into/onto the sorbent; c) subjecting the sorbent to desorption conditions by which at least a portion of the sorbed $CO_2$ is desorbed; and d) retrieving a $CO_2$-rich product stream that has a higher mol % of $CO_2$ than the feed gas mixture.

Other embodiments, including particular aspects of the embodiments summarized above, will be evident from the detailed description that follows.

DETAILED DESCRIPTION

Figure 1:
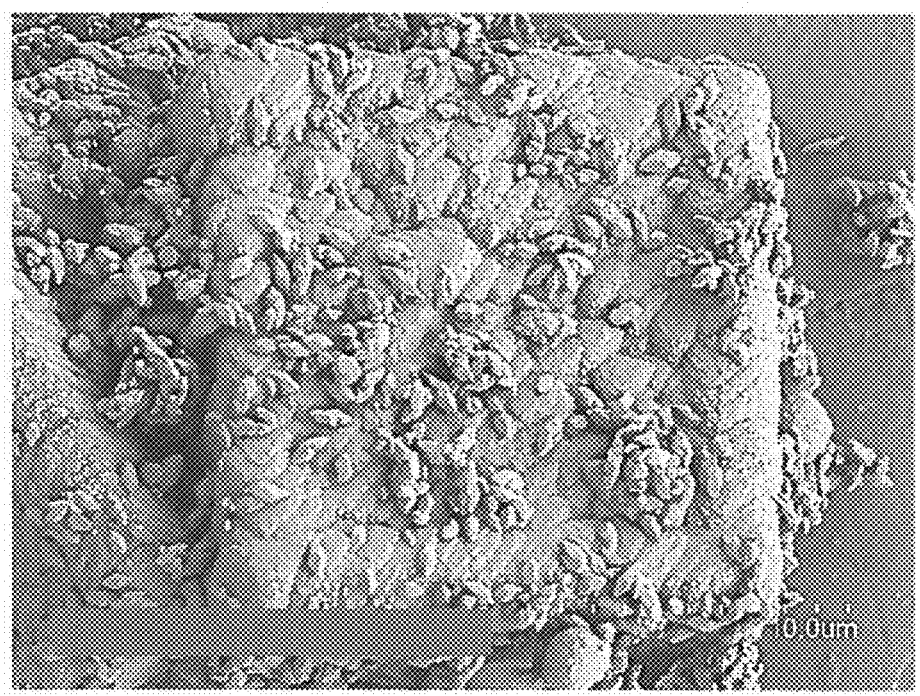
FIG. 1 illustrates core/shell crystals (Material 1A(i)) fabricated in stirring reactor at 500 RPM.

In various aspects of the invention, adsorbent materials, adsorbent contactors and gas separation processes using the adsorbent materials are provided.

I. Definitions

To facilitate an understanding of the present invention, a number of terms and phrases are defined below.

As used in the present disclosure and claims, the singular forms "a," "an," and "the" include plural forms unless the context clearly dictates otherwise.

Wherever embodiments are described herein with the language "comprising," otherwise analogous embodiments described in terms of "consisting of" and/or "consisting essentially of" are also provided.

The term "and/or" as used in a phrase such as "A and/or B" herein is intended to include "A and B", "A or B", "A", and "B".

As used herein, the term "adsorption" includes physisorption, chemisorption, and condensation onto a solid support, adsorption onto a solid support liquid, chemisorption onto a solid supported liquid and combinations thereof.

As used herein, the term "average particle size" refers to the average diameter of the particle, e.g., number average of the major axis and minor axis.

As used herein, the term "breakthrough" refers to the point where the product gas leaving the adsorbent bed exceeds the target specification of the contaminant component. At the breakthrough point, the adsorbent bed can be considered "spent", such that any significant further operation through the spent adsorption bed alone will result in off-specification product gas. As used herein, the "breakthrough" can generally coincide with the "adsorption front", i.e., at the time breakthrough is detected at the outlet of the adsorbent bed, the adsorption front is generally located at the end of the adsorption bed.

As used herein, the term "selectivity" refers to a binary (pairwise) comparison of the molar concentration of components in the feed stream and the total number of moles of these components adsorbed by the particular adsorbent during the adsorption step of the process cycle under the specific system operating conditions and feedstream composition. For a feed containing component A, component B, as well as additional components, an adsorbent that has a greater "selectivity" for component A than component B will have at the end of the adsorption step of the swing adsorption process cycle a ratio:

$U_A$=(total moles of A in the adsorbent)/(molar concentration of A in the feed)

that is greater than the ratio:

$U_B$=(total moles of B in the adsorbent)/(molar concentration of B in the feed)

where $U_A$ is the "Adsorption Uptake of component A" and $U_B$ is the "Adsorption Uptake of component B".

Therefore for an adsorbent having a selectivity for component A over component B that is greater than one:

Selectivity=$U_A/U_B$ (where $U_A>U_B$).

As used herein, the term "kinetic selectivity" refers to the ratio of single component diffusion coefficients, D (in $m^2$/sec), for two different species. These single component diffusion coefficients are also known as the Stefan-Maxwell transport diffusion coefficients that are measured for a given adsorbent for a given pure gas component. Therefore, for example, the kinetic selectivity for a particular adsorbent for component A with respect to component B would be equal to $D_A/D_B$. The single component diffusion coefficients for a material can be determined by tests well known in the adsorptive materials art. The preferred way to measure the kinetic diffusion coefficient is with a frequency response technique described by Reyes et al. in "Frequency Modulation Methods for Diffusion and Adsorption Measurements in Porous Solids", J. Phys. Chem, B. 101, pages 614-622, 1997. In a kinetically controlled separation it is preferred that kinetic selectivity (i.e., $D_A/D_B$) of the selected adsorbent for the first component (e.g., Component A) with respect to the second component (e.g., Component B) be greater than 5, greater than 20, and particularly greater than 50.

As used herein, the term "equilibrium selectivity" is defined in terms of the slope of the single component uptake into the adsorbent (in μmole/g) vs. pressure (in torr) in the linear portion, or "Henry's regime", of the uptake isotherm for a given adsorbent for a given pure component. The slope of this line is called herein the Henrys constant or "equilibrium uptake slope", or "H". The "equilibrium selectivity" is defined in terms of a binary (or pairwise) comparison of the Henrys constants of different components in the teed for a particular adsorbent. Therefore, for example, the equilibrium selectivity for a particular adsorbent for component A with respect to component B would be HA/HB. It is preferred that in an equilibrium controlled separation the equilibrium selectivity (i.e., HA/HB) of the selected adsorbent for the first component (e.g., Component A) with respect to the second component (e.g., Component B) be greater than 5, greater than 20, and particularly greater than 50.

As used herein, the term "volume adsorptive capacity" refers to the percentage of the volume of the adsorbent material accessible to the molecule that can be ad sorbed.

As used herein, the term "Si/Al ratio" is defined as the molar ratio of silica to alumina of a zeolitic structure.

II. Adsorbent Material

In a first embodiment an absorbent material is provided that can comprise a porous, solid core, and at least one coating on the core. The at least one coating can be chemically bonded or grown on the core in a continuous layer. The adsorbent material described herein is not a physical mixture between the core and the coating.

In various aspects, the core and coating, separately or in combination, can have a volume adsorptive capacity of the volume of the adsorbent of less than or equal to about 50%, about 45%, about 40%, about 35%, about 30%, about 25%, about 20%, about 15%, about 10%, or about 5%. Particularly, the volume adsorptive capacity of the core can be less than about 35%. Additionally or alternatively, the core and coating, separately or in combination, can have a volume adsorptive capacity of the volume of the adsorbent of greater than or equal to about 50%, about 45%, about 40%, about 35%, about 30%, about 25%, about 20%, about 15%, about 10%, or about 5%. Ranges expressly disclosed include any combination of the above-enumerated upper and lower limits, e.g., 5% to 35%, 10% to 35%, 15% to 35%, 20% to 35%, 25% to 35%, 30% to 35%, 5% to 50%, 15% to 40%, 25% to 35%, etc.

The kinetic selectivity and diffusivity of the least one coating grown on the core can allow for the transport of first component (e.g., component A) over a second component (e.g., component B) into the core of the adsorbent material. For example, the at least one coating can allow for more rapid transport of $CO_2$ while slowing down transport of $CH_4$ so that the core can adsorb more of the $CO_2$ rather than the $CH_4$.

Additionally or alternatively, the core and the coating can each independently have a kinetic selectivity for a first component over a second component of greater than or equal to about 5, about 10, about 20, about 30, about 40, about 50, about 60, about 70, about 80, about 90, about 100, about 150, about 200, about 250, about 300, about 350, about 400, about 450, about 500, about 550, or about 600. Exemplary components include but are not limited to $N_2$, $H_2S$, $CO_2$ and $CH_4$. Particularly, the coating can have a kinetic selectivity for $CO_2$ over $CH_4$ of greater than about 100, about 200, and about 500. For example, the coating can have a kinetic selectivity for $CO_2$ over $CH_4$ between about 100 and about 200, about 100 and about 300, about 100 and about 400, or between about 100 and about 500. Additionally or alternatively, the coating can have a kinetic selectivity for $N_2$ over $CH_4$ of greater than about 100, about 200, and about 500. Additionally or alternatively, the coating can have a kinetic selectivity for $H_2S$ over $CH_4$ of greater than about 100, about 200, and about 500.

Additionally or alternatively, the core and the coating each independently comprise a porous material. The porous material can be a microporous solid having a pore diameter between 0.1 nm to 2 nm. Additionally or alternatively, the porous material can be a mesoporous solid having a pore diameter between 2 nm to 50 nm.

Additionally or alternatively, the core comprises a zeolite. The zeolite can have a Si/Al ratio of greater than or equal to 1. Examples of suitable zeolites include, but are not limited to the following zeolite frameworks: CHA, MFI and combinations thereof. Particularly, the core comprises CHA. Examples of CHA zeolites include but are not limited to silica-CHA (Si-CHA), SAPO-34, AlPO-34, SSZ-13, CoAPO-44, CoAPO-47, DAF-5, GaPO-34, LZ-218, MeAPO-47, MeAPSO-47, Phi, SAPO-47, SSZ-62, UiO-21, ZK-14, ZYT-6, [Al—As—O]-CHA, [Al—Co—P—O]-CHA, [Co—Al—P—O]-CHA, [Mg—Al—P—O]-CHA, [Si—O]-CHA, [Zn—Al—P—O]-CHA, [Zn—As—P—O]-CHA, |Co| [Be—P—O]-CHA, |Co₃ (C₆N₄H₂₄)₃(H₂O)₉| [Be₁₈P₁₈O₇₂]-CHA, |Li—Na| [Al—Si—O]-CHA, Dehyd. Na-Chabazite, K-Chabazite, Linde D and Linde R. A person of ordinary skill in the art knows how to make the aforementioned zeolites. For example, see the references provided in the International Zeolite Association's database of zeolite structures found at www.iza-structure.org/databases. Particularly, the CHA zeolite is Si-CHA. Syntheses of various ZSM materials are described in U.S. Pat. Nos. 3,702,886; 3,709,979; 3,832,449; 4,016,245; 4,046,859; and 4,375,458, all of which are hereby incorporated by reference in their entireties.

Additionally or alternatively, at least one coating is present on the core. For example at least two coatings, at least three coatings, at least four coatings, at least five coatings, at least six coatings, at least seven coatings, at least eight coatings, at least nine coatings or at least ten coatings can be present on the core. Additionally or alternatively, less than two coatings, less than three coatings, less than four coatings, less than five coatings, less than six coatings, less than seven coatings, less than eight coatings, less than nine coatings or less than ten coatings can be present on the core. Ranges expressly disclosed include any combination of the above-enumerated upper and lower limits, e.g., one to ten coatings, two to eight coatings, three to seven coatings, etc.

Additionally or alternatively, the coating can comprise a zeolite, a polymer, an amorphous silica, a titanosilicate, a ferrosilicate, a stannosilicate, an aluminophosphate, a silicaaluminophosphate, carbon molecular sieves and/or combinations thereof. Examples of a suitable polymer include but are not limited to a polyimide, a polysulfone, a functionalized polymer and combinations thereof. Particularly, the at least one coating can comprise a zeolite. Examples of suitable zeolites include, but are not limited to the following zeolite frameworks: CDO, MFI, DOH, DDR and combinations thereof. Particularly, the at least one coating can comprise DDR. Examples of DDR zeolites include, but are not limited to Sigma-1 and ZSM-58. A person of ordinary skill in the art knows how to make the aforementioned zeolites. For example, see the references provided in the International Zeolite Association's database of zeolite structures found at www.iza-structure.org/databases. Particularly, the DDR zeolite is Sigma-1.

Additionally or alternatively, the core comprises Si-CHA and the at least one coating comprises Sigma-1. Other exemplary core/coating combinations include, but are not limited to, any combination of the above listed CHA zeolites and DDR zeolites, e.g., Si-CHA/ZSM-58, SAPO-34/Sigma-1, SAPO-34/ZSM-58, AlPO-34/Sigma-1, AlPO-34/ZSM-58, SSZ-13/Sigma-1, and SSZ-13/ZSM-58, etc.

Additionally or alternatively, the core can have an average crystal size of greater than or equal to about 2 µm, about 4 µm, about 6 µm, about 8 µm, about 10 µm, about 12 µm, about 14 µm, about 16 µm, about 18 µm, about 20 µm, about 22 µm, about 24 µm, about 26 µm, about 28 µm, about 30 µm, about 32 µm, about 34 µm, about 36 µm, about 38 µm, or about 40 µm. Additionally or alternatively, the core can have an average crystal size of less than or equal to about 2 µm, about 4 µm, about 6 µm, about 8 µm, about 10 µm, about 12 µm, about 14 µm, about 16 µm, about 18 µm, about 20 µm, about 22 µm, about 24 µm, about 26 µm, about 28 µm, about 30 µm, about 32 µm, about 34 µm, about 36 µm, about 38 µm, or about 40 µm. Ranges expressly disclosed include combinations of the above-enumerated upper and lower limits, e.g., 2 µm to 40 µm, 6 µm to 36 µm, 10 µm to 20 µm, etc.

Additionally or alternatively, the at least one coating can be present on the core in a thickness of at least about 0.1 µm, about 0.2 µm, about 0.3 µm, about 0.4 µm, about 0.5 µm, about 0.6 µm, about 0.7 µm, about 0.8 µm, about 0.8 µm, about 1.0 µm, about 1.1 µm, about 1.2 µm, about 1.3 µm, about 1.4 µm, about 1.5 µm, about 1.6 µm, about 1.7 µm, about 1.8 µm, about 1.9, or about 2.0 µm. Additionally or alternatively, the at least one coating can be present on the core in a thickness of not greater than 0.1 µm, about 0.2 µm, about 0.3 µm, about 0.4 µm, about 0.5 µm, about 0.6 µm, about 0.7 µm, about 0.8 µm, about 0.8 µm, about 1.0 µm, about 1.1 µm, about 1.2 µm, about 1.3 µm, about 1.4 µm, about 1.5 µm, about 1.6 µm, about 1.7 µm, about 1.8 µm, about 1.9, or about 2.0 µm. Ranges expressly disclosed include combinations of the above-enumerated values, e.g., 0.1 µm to 2.0 µm, 0.5 µm to 1.5 µm, 1.0 µm to 1.8 µm, etc.

Additionally or alternatively, the at least one coating and the core can be present in a weight ratio of coating to core of about 1:1, about 2:1, about 3:1, about 4:1, about 5:1, about 6:1, about 7:1, about 8:1, about 9:1, about 10:1, about 12:1, about 14:1, about 16:1, about 18:1, about 20:1, about 22:1, about 24:1, about 26:1, about 28:1, about 30:1, about 32:1, about 34:1, about 36:1, about 38:1, or about 40:1. Additionally or alternatively, the at least one coating and the core can be present in weight ratio of coating to core of about 1:2, about 1:3, about 1:4, about 1:5, about 1:6, about 1:7, about 1:8, about 1:9, about 1:10, about 1:12, about 1:14, about 1:16, about 1:18, about 1:20, about 1:22, about 1:24, about 1:26, about 1:28, about 1:30, about 1:32, about 1:34, about 1:36, about 1:38, or about 1:40. Ranges expressly disclosed include any combination of the above-enumerated ratios, e.g., 1:1 to 40:1, 4:1 to 32:1, 1:2 to 1:38, 1:10 to 1:28, etc. Particularly, the at least one coating and the core can be present in a weight ratio of coating to core of about 6:1 to about 30:1, e.g., about 6:1 to about 30:1, about 7:1 to about 30:1, about 8:1 to about 30:1, about 9:1 to about 30:1, about 10:1 to about 30:1, about 15:1 to about 30:1, about 20:1 to about 30:1, about 25:1 to about 30:1, etc.

Additionally or alternatively, the adsorbent material can be in the form of particles having an average particle size from about 2 µm to about 40 µm, for example about 2 µm to about 20 µm, about 5 µm to about 20 µm, about 10 µm to about 20 µm, about 5 µm to about 15 µm, about 10 µm to about 15 µm, about 15 µm to about 20 µm, etc. Examples of suitable shapes of the adsorbent material particles include, but are not limited to, spherical, ellipsoidal, cylindrical, cubical, prismatic, polylobar, and irregular.

Additionally or alternatively, the adsorbent particles can be employed in separation membranes, on solid supports, and/or in packed beds.

III. Gas Separation Processes and Adsorbent Contactors

In another embodiment, a gas separation process is provided herein. The gas separation process comprises contacting a gas mixture containing at least one contaminant with an adsorbent material as described herein.

In various aspects, the gas separation process can be achieved by swing adsorption processes, such as pressure swing adsorption (PSA) and temperature swing adsorption (TSA). All swing adsorption processes have an adsorption step in which a feed mixture (typically in the gas phase) is flowed over an adsorbent that preferentially adsorbs a more readily adsorbed component relative to a less readily adsorbed component. A component may be more readily adsorbed because of kinetic or equilibrium properties of the adsorbent material.

PSA processes rely on the fact that gases under pressure tend to be adsorbed within the pore structure of the adsorbent materials. Typically, the higher the pressure, the greater the amount of targeted gas component that will be adsorbed. When the pressure is reduced, the adsorbed targeted component is typically released, or desorbed. PSA processes can be used to separate gases of a gas mixture, because different gases tend to fill the pores or free volume of the adsorbent to different extents due to either the equilibrium or kinetic properties of the adsorbent. In many important applications, to be described as "equilibrium-controlled" processes, the adsorptive selectivity is primarily based upon differential equilibrium uptake of the first and second components. In another important class of applications, to be described as "kinetic-controlled" processes, the adsorptive selectivity is primarily based upon the differential rates of uptake of the first and second components.

TSA processes also rely on the fact that gases under pressure tend to be adsorbed within the pore structure of the adsorbent materials. When the temperature of the adsorbent is increased, the adsorbed gas is typically released, or desorbed. By cyclically swinging the temperature of adsorbent beds, TSA processes can be used to separate gases in a mixture when used with an adsorbent selective for one or more of the components in a gas mixture. Partial pressure purge displacement (PPSA) swing adsorption processes regenerate the adsorbent with a purge. Rapid cycle (RC) swing adsorption processes complete the adsorption step of a swing adsorption process in a short amount of time. For kinetically selective adsorbents, it can be preferable to use a rapid cycle swing adsorption process. If the cycle time becomes too long, the kinetic selectivity can be lost. These swing adsorption protocols can be performed separately or in combinations. Examples of processes that can be used herein either separately or in combination are PSA, TSA, PTSA, PPSA, PPTSA, RCPSA, RCTSA, RCPPSA and RCPTSA.

Additionally or alternatively, the processes of the present invention can comprise an adsorption step in which the preferentially adsorbed components (target species) of the feed mixture can be adsorbed by the adsorbent material described herein as contained in an adsorbent contactor, such as an adsorbent bed, while recovering the less preferentially adsorbed components at the product end of the adsorbent bed at process pressures. The process pressure represents the pressure at the outlet end of the contactor and can preferably be managed to be no more than 8 bara lower than the feed pressure (as measured at the entrance to the adsorbent bed, i.e., the inlet end of the contactor), e.g., no more than 4 bara lower or no more than 1 bara lower. Additionally or alternatively, the adsorption step of the present invention can be performed at a first temperature from −195° C. to 300° C., particularly from 20° C. to 150° C. or from 30° C. to 120° C. Total feed pressures during the adsorption step can range from 1 bara to 600 bara, e.g., from 2 bara to 200 bara or from 10 bara to 150 bara. It can be preferred to manage the temperature rise from the heat of adsorption during the adsorption step. The system herein can thus be designed so that the heats of adsorption are in the range from 5 to 150 kJ/mol of molecules adsorbed. One method to manage the heat of adsorption can be to incorporate a thermal mass into the adsorption bed to mitigate the temperature rise occurring during the adsorption step. The temperature rise from the heat of adsorption can additionally or alternately be managed in a variety of ways, such as by flowing a cooling fluid through the passages external to the adsorbent bed (i.e., the passages that are used to heat and cool the contactor).

Additionally or alternatively, the passages external to the adsorbent bed can be filled with a fluid that is not flowing during the adsorption process. In this case, the heat capacity of the fluid can serve to mitigate the temperature rise in the adsorbent bed. Combinations of some or all of these heat management strategies can be employed. Even with these heat management strategies, during this step, the final temperature of the bed can typically be slightly higher than the feed inlet temperature. Particularly, the degree of adsorption and cooling can be managed so that the maximum temperature rise at any point within the contactor can be less than 40° C., e.g., less than 20° C., less than 10° C., or less than 5° C. During adsorption, the strongest-adsorbing components can tend to attach most strongly to the adsorbent and can thus be least mobile. Such strongest-adsorbing components can thus tend to occupy regions of adsorbent closest to the inlet and can generally displace weakly adsorbed components from those regions.

Over the period of adsorption, the adsorbates can tend to order themselves from strongest to weakest, moving from inlet to outlet of the adsorption channels of the contactor. In preferred embodiments, the feed gas velocity can be chosen so that a relatively sharp concentration front moves through the contactor, i.e., such that the concentration gradient of adsorbate(s) extends over a relatively short distance, taking into consideration the absolute amplitude of the gradient.

The adsorption step can be stopped at a predetermined point before the adsorption front breaks through the product output end of the adsorbent bed. The adsorption front can move at least 30% of the way down the bed, e.g., at least 50% or at least 80%, before the adsorption step is stopped. Additionally or alternatively, the adsorption step can be conducted for a fixed period of time set by the feed flow rate and adsorbent capacity. Further additionally or alternatively, the adsorption step can be conducted for a time less than 600 seconds, particularly less than 120 seconds, e.g., less than 40 seconds or less than 10 seconds. In some instances, the adsorption front can be allowed to break through the output end only for a short duration (e.g., for at most a few seconds), but usually the adsorption front is not allowed to break through, which can maximize utilization of the bed.

After the adsorption step, the feed gas channels in the contactor can optionally be depressurized to a pressure such that less than 40% of the molecules adsorbed in the contactor desorb (e.g., less than 20% or less than 10%). This pressure can typically be greater than the sum of fugacity of the selectively adsorbed species in the feed.

The feed input end of the adsorbent bed can then be sealed with respect to the passage of a gas, and heat can be externally applied to the adsorbent bed. By "externally heated" it is meant that heat is not applied directly to the adsorbent bed through the flow channels through which the feed gas mixture had flowed and into which the target gas component will be desorbed. The heat can be delivered to the adsorbent bed through a plurality of heating/cooling channels in thermal communication, but not in fluid communication, with the feed gas flow channels of the adsorbent. The adsorbent bed can be externally heated co-currently or counter-currently along its length with respect to the flow of the feed gas mixture, or in a combination of co-current and counter-current heating steps. The flow channels that will carry heating and cooling fluid can be in physical contact with the adsorbent bed to enhance heat transfer. The adsorbent bed can be heated to a second temperature higher than the first temperature used during the adsorption step, the second temperature at least 10° C. higher than the first temperature, e.g., at least 20° C. higher, at least 40° C. higher, or at least 90° C. higher; additionally or alternatively, the second temperature can be from 10° C. to 300° C., e.g., from 20° C. to 200° C. or from 40° C. to 120° C.

During the heating step, the gas pressure in the channel can tend to rise. To improve regeneration at the product end of the bed, during the heating step, the bed can advantageously be slowly purged with clean gas from the clean end (product end) of the adsorbent bed to the point of product recovery. By "clean gas" it is meant that a gas is substantially free of target gas components. For example, if the target gas is an acid gas, then the clean gas will be a stream substantially free of acid gases such as $H_2S$ and/or $CO_2$. In one embodiment, clean gas will contain less than 5 mol % of $H_2S$ and/or $CO_2$, and particularly less than 1 mol % of $H_2S$ and/or $CO_2$. An example of a suitable clean gas would be the product gas itself. When the current invention is utilized for the removal of acid gas from a natural gas stream, in one embodiment, the "clean gas" is comprised of at least one of the hydrocarbon product streams, and in another embodiment is comprised of $C_3$-hydrocarbons, and in another embodiment is comprised of methane. In other embodiments, a separate "clean gas" can be used. In one of these embodiments, the "clean gas" is comprised of nitrogen.

The purge can be introduced at a pressure higher than the pressure in the adsorbent bed. It can be preferred for the total number of moles of purge gas introduced to be less that the number of moles of molecules adsorbed in the contactor, e.g., less than 25% or less that 10% of the number of moles adsorbed. By preventing the adsorption front from breaking through, the product end of the bed can be kept substantially free of the strongly-adsorbed species and can advantageously contain predominantly product species. The isotherms of the adsorbed target component can determine the partial pressure of the preferentially adsorbed component in equilibrium, with the new loading at the higher temperature. This partial pressure can, in some cases, be in excess of 40%/o greater than the feed pressure, or as much as 70% higher or more. Additionally or alternatively to the recovered sensible heat, a small amount of extra heat may be required to heat the bed to the final predetermined temperature. The isotherm can describe the amount of loading (mmol of adsorbed species per gram of adsorbent) for both chemisorption and physisorption processes.

The external heating can be conducted such that a thermal wave is used to pass heat through the contactor, as it transitions from the adsorption step to the regeneration step, in transitioning from the regeneration to adsorption step, in at least part of the regeneration step, and/or in at least part of the adsorption step. Similarly, it can be preferred to utilize a thermal wave in the cooling step. A thermal wave is a relatively sharp temperature gradient, or front, that can move linearly (i.e., approximately in a single direction within the contactor) during at least one step in the thermal swing adsorption/desorption cycle. The speed at which the thermal front (i.e., region with sharp temperature gradient) can move is referred to as the thermal wave velocity. The thermal wave velocity need not be constant, and the thermal wave direction need not be the same in both adsorption and regeneration steps. For example, the wave can move co-currently, counter-currently, or cross-flow in the adsorption and/or regeneration steps. It is also possible to design a process in which there is no significant thermal wave present in the adsorption step while there is a significant thermal wave in the regeneration step. The presence of a thermal wave in at least some portion of the thermal swing adsorption/regeneration cycle can enable the overall system to achieve a goal of substantially recuperating and recovering the heat required to temperature-swing the adsorbent bed. This, in turn, can improve process efficiency and/or can enable the use of high desorption temperatures that would not normally be considered for TSA operation.

Additionally or alternatively, the contactor is combined with the adsorbent material into a heat exchange structure in a manner that can produce a thermal wave. In Thermal Wave Adsorption (TWA), adsorbent can be placed in one set of heat exchanger channels, while the other set of channels can be used to bring heat into and/or take heat out of the adsorbent device. Fluids and/or gases flowing in the adsorbent and heating/cooling channels do not generally contact each other. The heat adding/removing channels can be designed and operated in a manner that results in a relatively sharp temperature wave in both the adsorbent and in the heating and cooling fluids during the heating and cooling steps in the cycle. An example of a contactor that can produce a relatively sharp thermal wave is a contactor as described herein.

Relatively sharp thermal waves, as used herein, can be expressed in terms of a standard temperature differential over a distance relative to the length of the mass/heat transfer flow in the apparatus. With respect to the mass/heat transfer, we can define a maximum temperature, $T_{max}$, and a minimum temperature, $T_{min}$, as well as convenient temperatures about 10% above $T_{min}$, ($T_{10}$) and about 10% below $T_{max}$ ($T_{90}$). Thermal waves can be said to be relatively sharp when at least the temperature differential of ($T_{90}$-$T_{10}$) occurs over at most 50% (e.g., at most 40%, at most 30%, or at most 25%) of the length of the apparatus that participates in the mass/thermal transfer. Additionally or alternatively, relative sharp thermal waves can be expressed in terms of a maximum Peclet number, Pe, defined to compare axial velocity of the heating/cooling fluid to diffusive thermal transport roughly perpendicular to the direction of fluid flow. Pe can be defined as $(U*L)/\alpha$, where U represents the velocity of the heating/cooling fluid (in m/s), L represents a characteristic distance over which heat is transported (to warm/cool the adsorbent) in a direction roughly perpendicular to the fluid flow, and a represents the effective thermal diffusivity of the contactor (in m2/s) over the distance L. In addition or alternately to the thermal differential over length, thermal waves can be said to be relatively sharp when Pe is less than 10, for example less than 1 or less than 0.1. To minimize time for heating/cooling of the contactor with little or no damage to the flow channel, it can be preferred for U to be in a range from about 0.01 m/s to about 100 m/s, e.g., from about 0.1 m/s to about 50 m/s or from about 1 m/s to about 40 m/s. Additionally or alternatively, to minimize size and energy requirements, it can be preferred for L to be less than 0.1 meter, e.g., less than 0.01 meter or less than 0.001 meter.

Thermal waves in such contactors can be produced when the heating and cooling fluids are flowed co-current or counter-current to the direction of the feed flow in the adsorption step. In many cases, it can be preferred not to have a significant flow of heating or cooling fluids during the adsorption step. A more comprehensive description of Thermal Wave Adsorption (TWA) and other appropriate contactor structures can be found, e.g., in U.S. Pat. No. 7,938,886, which is incorporated herein by reference. This reference shows how to design and operate a contactor to control the sharpness and nature of a thermal wave. A key operational parameter can include the fluid velocity in the contactor. Key design parameters can include the mass of the contactor and heat capacity and thermal conductivity of materials used to form the contactor and heat transfer fluid. An additional key design objective for the contactor can be finding one or more ways to reduce/minimize the distance over which heat has to be transferred, which is why relatively sharp thermal waves can be so desirable.

Additionally or alternatively, during the heating step, the volume of fluid at a temperature no more than 10° C. warmer than the end of the contactor from which it is produced can represent at least 25% (e.g., at least 50% or at least 75%) of the volume of the fluid introduced into the contactor for heating. Similarly, when the present invention is operated to attain a thermal wave, it can be preferred that, during the cooling step, a cold fluid (such as pressurized water) can be flowed into the contactor and a hot fluid near the temperature of the contactor at the end of the recovery step can flow out of the contactor. Most of the recovery step can generally occur after the contactor has been heated. Thus additionally or alternatively during the cooling step, the volume of fluid at a temperature no more than 10° C. colder than the end of the contactor from which it is produced can represent at least 25% (e.g., at least 50% or at least 75%) of the volume of the fluid introduced into the contactor for cooling.

One way to efficiently utilize thermal waves in the apparatuses according to the invention can be for heat recovery. The recovered energy can be used to reduce the energy requirements for heating and cooling of the contactor, for a different contactor of a multitude of contactors needed for a continuous process, and/or for any other purpose. More specifically, energy contained in the hot stream exiting the contactor during the cooling step can be utilized to reduce the energy that must be supplied during the heating step. Similarly, the cold stream exiting the contactor during the heating step can be utilized to reduce the energy that must be supplied to cool fluid to be supplied to the contactor during the cooling step. There are many ways to recoup the energy. For example, the hot thermal fluid flowing out of one contactor can be sent to another with trim heating in between, and/or the cold fluid flowing out of one contactor can be sent to another with trim cooling in between. The thermal fluid flow path between contactors can be determined by valves timed to route thermal fluid between contactors at appropriate points in the overall swing adsorption cycle. In embodiments where thermal fluid flows between contactors, it may also pass through a heat exchanger that adds or removes heat from the flowing thermal fluid and/or pass through a device, such as a compressor, pump, and/or blower, that pressurizes it so it can flow at the desired rate though the contactors. A heat storage medium can be configured so that the energy from the thermal wave moving through one contactor can be stored. A non-limiting example is a tank system that separately stores hot and cold fluids, which can each be fed back into the contactor that produced it and/or to another contactor. In many embodiments, the flow of the thermal fluid through the contactor can be arranged to minimize the mixing of the fluid in the direction of the general flow of the fluid through the contactor and to minimize the effect of the thermal conductivity of the fluid on the sharpness of the temperature wave.

Where energy is recovered, the recovered energy can be used to reduce the amount of sensible heat that must be supplied to heat and cool the contactor. The sensible heat is determined by the heat capacity and temperature rise (or fall) of the contactor. In some embodiments, at least 60% (e.g., at least 80% or at least 95%) of the sensible heat required for heating the contactor is recouped, and/or at least 60% (e.g., at least 80% or at least 95%) of the sensible heat needed to cool the contactor is recouped.

This external heating of the partially sealed adsorbent bed will result in at least a portion of the target species being desorbed from the adsorbent bed. It can also result in an increase in pressure of the resulting target species component stream. At least a portion of the desorbed target species component is recovered at pressures higher than that at the initiation of the heating step. That is, recovery of target gas will take place toward the end of the heating step with minimum or no depressurization of the adsorbent bed. It is preferred that the pressure be a least 2 bar, particularly at least 5 bar higher than that at the initiation of the heating step.

The pressure in the adsorbent bed is then reduced, particularly in a series of blow-down steps in a co-current or counter-current and can be performed with or without a purge gas stream to the final target gas recovery pressure. Pressure reduction can occur in less than 8 steps, particularly in less than 4 steps, with target species being recovered in each step. In one embodiment, the pressure is decreased by a factor of approximately three in each step. It is also preferred that the depressurization be conducted counter-currently and that during the depressurizing step a purge gas be passed counter-current (from product end to feed end) through the adsorbent bed. It is also preferred that the purge gas be a so-called clean gas as previously described.

In another embodiment, in any step, other than the adsorption step, the clean gas is conducted counter-currently through the adsorbent bed to ensure that the end of the bed is substantially free of target species. In another embodiment, the clean gas is conducted counter-currently through the adsorbent bed in at least a portion of the desorption steps. An effective rate of counter-current flowing clean gas is preferred during these step(s) to overcome mass diffusion to ensure that the product end of the bed is kept substantially free of the target species.

After the target gas has been recovered, the adsorbent bed can be cooled and repressurized. One can cool the bed before repressurization. The adsorbent bed can be cooled, particularly to a temperature that is no more than 40° C. above the temperature of feed gas mixture, e.g., no more than 20° C. above or no more than 10° C. above. Additionally or alternatively, the adsorbent bed can be cooled by external cooling in a co-current or counter-current manner, such that a thermal wave can pass through the bed. In some such embodiments, the first part of the adsorbent bed can be cooled then repressurized. In certain of those embodiments, less than 90% of the length of adsorption bed can be cooled, e.g., less than 50%. The adsorbent bed can additionally or alternatively be purged with a clean gas during cooling.

The adsorbent bed can then be repressurized, during and/or after the cooling step, e.g., using clean product gas or counter-currently with blow-down gas from another bed after a first stage of repressurization. The final pressure of the repressurization step can be substantially equal to the pressure of the incoming feed gas mixture.

Additionally or alternatively, $CO_2$ can be removed from a feed gas mixture in the swing adsorption process. Thus, in one embodiment a process for selectively separating $CO_2$ from a feed gas mixture is provided. The process comprising: a) contacting the feed gas mixture under sorption conditions with the adsorbent material described herein; b) sorbing the $CO_2$ into/onto the sorbent; c) subjecting the sorbent to desorption conditions by which at least a portion of the sorbed $CO_2$ is desorbed; and d) retrieving a $CO_2$-rich product stream that has a higher mol % of $CO_2$ than the feed gas mixture. The gas mixture can comprise $CH_4$, such as but not limited to natural gas or gas associated with the production of oil. A gas mixture comprising $CH_4$ can contain significant levels of contaminants such as $H_2O$, $H_2S$, $CO_2$, $N_2$, mercaptans, and/or heavy hydrocarbons.

The kinetic selectivity and diffusivity of the coating of the adsorbent material can allow $CO_2$ to be rapidly transmitted into the core while hindering the transport of $CH_4$, so that it is possible to selectively separate $CO_2$ from a mixture of $CO_2$ and $CH_4$. Further, the higher adsorption capacity of the core in comparison to the coating can allow for increased $CO_2$ adsorption.

Additionally or alternatively, nitrogen may desirably be removed from natural gas or gas associated with the production of oil to obtain high recovery of a purified methane product from nitrogen containing gas.

Additionally or alternatively, $H_2S$ may desirably be removed from natural gas or gas associated with the production of oil to obtain high recovery of a purified methane product from nitrogen containing gas.

Additionally or alternatively, olefinic gases may desirably be preferentially removed from a hydrocarbon gas stream containing olefinic and paraffinic gases.

Additionally or alternatively, the gas mixture can comprise $NO_x$ and/or $SO_x$ species as contaminants, such as a waste gas stream, a flue gas stream and a wet gas stream. As used herein, the terms "$NO_x$," and "$NO_x$" species refers to the various oxides of nitrogen that may be present in waste gas, such as waste gas from combustion processes. The terms refer to all of the various oxides of nitrogen including, but not limited to, nitric oxide (NO), nitrogen dioxide ($NO_2$), nitrogen peroxide ($N_2O$), nitrogen pentoxide ($N_2O_5$), and mixtures thereof. As used herein, the terms "$SO_x$," and "$SO_x$ species," refers to the various oxides of sulfur that may be present in waste gas, such as waste gas from combustion processes. The terms refer to all of the various oxides of sulfur including, but not limited to, SO, $SO_2$, $SO_3$, $SO_4$, $S_7O_2$, and $S_6O_2$. Thus, it can be desirable to remove $NO_x$ and/or $SO_x$ species.

Thus, examples of contaminants include, but are not limited to $H_2O$, $H_2S$, $CO_2$, $N_2$, mercaptans, heavy hydrocarbons, olefins, $NO_x$ and/or $SO_x$ species.

Additionally or alternatively, an adsorbent contactor for use in the swing adsorption gas separation processes described herein is provided. The adsorbent contactor comprises a) a gas inlet end; and b) a gas outlet end; wherein the gas inlet end and the gas outlet end are in fluid connection by a plurality of open flow channels wherein the surface of the open flow channels are comprised of the adsorbent material described herein.

The adsorbent contactor can be in the form of open flow channels, e.g., parallel channel connectors, in which the majority of the open pore volume is attributable to microporous pore diameters, e.g., in which less than 40%, particularly less than 20%, for example less than 15%, or less than 10%, of its open pore volume can originate from pore diameters greater than 20 angstroms (and less than about 1 micron; i.e., from mesoporous and macroporous pore diameters).

A flow channel is described herein as that portion of the contactor in which gas flows if a steady state pressure difference is applied between the point/place at which a feed stream enters the contactor and the point/place a product stream leaves the contactor. By "open pore volume" herein, it is meant all of the open pore space not occupied in the volume encompassed by the adsorbent material. The open pore volume includes all open spaces in the volume encompassed by the adsorbent material, including but not limited to all volumes within the adsorbent materials themselves, including the pore volume of the structured or amorphous materials, as well as any interstitial open volumes within the structure of the portion of the bed containing the adsorbent material. Open pore volume, as used herein, does not include spaces not accompanied by the adsorbent material such as open volumes in the vessel for entry, exit, or distribution of gases (such as nozzles or distributor areas), open flow channels, and/or volumes occupied by filler materials and/or solid heat adsorption materials. "Parallel channel contactors" are defined herein as a subset of adsorbent contactors comprising structured (engineered) adsorbents in which substantially parallel flow channels are incorporated into the adsorbent structure (typically the adsorbents can be incorporated ontofinto the walls of such flow channels). Non-limiting examples of geometric shapes of parallel channel contactors can include various shaped monoliths having a plurality of substantially parallel channels extending from one end of the monolith to the other; a plurality of tubular members, stacked layers of adsorbent sheets with and without spacers between each sheet; multi-layered spiral rolls; spiral wound adsorbent sheets; bundles of hollow fibers; as well as bundles of substantially parallel solid fibers; and combinations thereof. Parallel flow channels are described in detail, e.g., in U.S. Patent Application Publication Nos. 2008/0282892 and 2008/0282886, both of which are incorporated herein by reference. These flow channels can be formed by a variety of ways, and, in addition to the adsorbent material, the adsorbent contactor structure may contain items such as, but not limited to, support materials, heat sink materials, void reduction components, and heating/cooling passages.

It can be desirable to operate with a multiplicity of contactor units, with several coupled in a heating/cooling operation and others involved in adsorption (and/or desorption). In such an operation, the contactor can be substantially cooled by a circulating heat transfer medium before it is switched into service for adsorption. One advantage of such an operation can be that the thermal energy used to swing the bed is retained in the heat transfer medium. If adsorption were to proceed simultaneously with cooling, then a substantial part of the heat in the bed could be lost to the adsorbate-free feed, and a higher heat load could be needed to restore the high temperature of the heat transfer medium.

Adsorptive kinetic separation processes, apparatuses, and systems, as described above, are useful for development and production of hydrocarbons, such as gas and oil processing. Particularly, the provided processes, apparatuses, and systems can be useful for the rapid, large scale, efficient separation of a variety of target gases from gas mixtures.

The provided processes, apparatuses, and systems may be used to prepare natural gas products by removing contaminants. The provided processes, apparatuses, and systems can be useful for preparing gaseous feed streams for use in utilities, including separation applications such as dew point control, sweetening/detoxification, corrosion protection/control, dehydration, heating value, conditioning, and purification. Examples of utilities that utilize one or more separation applications can include generation of fuel gas, seal gas, non-potable water, blanket gas, instrument and control gas, refrigerant, inert gas, and hydrocarbon recovery. Exemplary "not to exceed" product (or "target") acid gas removal specifications can include: (a) 2 vol % $CO_2$, 4 ppm $H_2S$; (b) 50 ppm $CO_2$, 4 ppm $H_2S$; or (c) 1.5 vol % $CO_2$, 2 ppm $H_2S$.

The provided processes, apparatuses, and systems may be used to remove acid gas from hydrocarbon streams. Acid gas removal technology becomes increasingly important as remaining gas reserves exhibit higher concentrations of acid (sour) gas resources. Hydrocarbon feed streams can vary widely in amount of acid gas, such as from several parts per million to 90 vol %. Non-limiting examples of acid gas concentrations from exemplary gas reserves can include concentrations of at least: (a) 1 vol % $H_2S$, 5 vol % $CO_2$; (b) 1 vol % $H_2S$, 15 vol % $CO_2$; (c) 1 vol % $H_2S$, 60 vol % $CO_2$; (d) 15 vol % $H_2S$, 15 vol % $CO_2$; or (e) 15 vol % $H_2S$, 30 vol % $CO_2$.

One or more of the following may be utilized with the processes, apparatuses, and systems provided herein, to prepare a desirable product stream, while maintaining relatively high hydrocarbon recovery:

(a) using one or more kinetic swing adsorption processes, such as pressure swing adsorption (PSA), thermal swing adsorption (TSA), and partial pressure swing or displacement purge adsorption (PPSA), including combinations of these processes; each swing adsorption process may be utilized with rapid cycles, such as using one or more rapid cycle pressure swing adsorption (RC-PDS) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884, which are each herein incorporated by reference in its entirety;
(b) removing acid gas with RC-TSA using advanced cycles and purges as described in U.S. Provisional Application No. 61/447,858, filed Mar. 1, 2011, as well as the U.S. patent application bearing docket number 2011EM060-US2, claiming priority thereto, which are together incorporated by reference herein in their entirety;
(c) using a mesopore filler to reduce the amount of trapped methane in the adsorbent and increase the overall hydrocarbon recovery, as described in U.S. Patent Application Publication Nos. 2008/0282892, 2008/0282885, and 2008/028286, each of which is herein incorporated by reference in its entirety;
(d) depressurizing one or more RC-TSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor to optimize the overall compression system;
(e) using exhaust or recycle streams to minimize processing and hydrocarbon losses, such as using exhaust streams from one or more RC-TSA units as fuel gas instead of re-injecting or venting;
(f) using multiple adsorbent materials in a single bed to remove trace amounts of first contaminants, such as $H_2S$, before removal of a second contaminant, such as $CO_2$; such segmented beds may provide rigorous acid gas removal down to ppm levels with RC-TSA units with minimal purge flow rates;
(g) using feed compression before one or more RC-TSA units to achieve a desired product purity;
(h) contemporaneous removal of non-acid gas contaminants such as mercaptans, COS, and BTEX; selection processes and materials to accomplish the same;
(i) using structured adsorbents for gas-solid contactors to minimize pressure drop compared to conventional packed beds;
(j) selecting a cycle time and cycle steps based on adsorbent material kinetics; and
(k) using a process and apparatus that uses, among other equipment, two RC-TSA units in series, wherein the first RC-TSA unit cleans a feed stream down to a desired product purity and the second RC-TSA unit cleans the exhaust from the first unit to capture methane and maintain high hydrocarbon recovery; use of this series design may reduce the need for a mesopore filler.

The processes, apparatuses, and systems provided herein can be useful in large gas treating facilities, such as facilities that process more than five million standard cubic feet per day (MSCFD) of natural gas, for example more than 15 MSCFD, more than 25 MSCFD, more than 50 MSCFD, more than 100 MSCFD, more than 500 MSCFD, more than one billion standard cubic feet per day (BSCFD), or more than two BSCFD. Ranges expressly disclosed include any combination of the above-enumerated rates, e.g., 15 to 500 MSCFD, 50 to 100 MSCFD, or 25 to 50 MSCFD, etc.

IV. Further Embodiments

The invention can additionally or alternatively include one or more of the following embodiments.

Embodiment 1

An adsorbent material comprising a porous, solid core, wherein the core has a volume adsorptive capacity of less than 35% of the volume of the adsorbent material and at least one coating on the core, wherein the at least one coating has a kinetic selectivity for $CO_2$ over $CH_4$ of greater than 100.

Embodiment 2

The adsorbent material of embodiment 1, wherein the core and/or the at least one coating comprises a zeolite.

Embodiment 3

The adsorbent material of embodiment 2, wherein the zeolite comprises chabasite (CHA) (e.g., Si-CHA, SAPO-34, AlPO-34, SSZ-13 and combinations thereof).

Embodiment 4

The adsorbent material of embodiment 2, wherein the zeolite comprises DDR (e.g., Sigma-1, ZSM-58 and a combination thereof).

Embodiment 5

The adsorbent material of any one of the previous embodiments, wherein the core comprises Si-CHA and the at least one coating comprises Sigma-1.

Embodiment 6

The adsorbent material of any one of the previous embodiments, wherein the at least one coating and the core are present in a weight ratio of coating to core of about 6:1 to about 30:1 and/or about 1:1.

Embodiment 7

The adsorbent material of any one of the previous embodiments, wherein the adsorbent material is in the form of particles having an average particle size from about 2 µm to about 20 µm.

Embodiment 8

The adsorbent material of any one of the previous embodiments, wherein the core/coating combination is selected from the group consisting of (CHA/Sigma-1), (CHA/SiO2 silica), (ZSM-58/Sigma-1), (CHA/ZSM-58), (ZSM-5/UZM-19), (CHA/AEI), and (DDR/DOH).

Embodiment 9

An adsorbent material comprising a core comprising CHA (e.g., Si-CHA) and at least one coating on the core, wherein the coating comprises DDR (e.g., Sigma-1).

Embodiment 10

The adsorbent material of embodiment 9, wherein the core has a volume adsorptive capacity of less than 35% of the volume of the adsorbent material and/or the at least one coating has a kinetic selectivity for $CO_2$ over $CH_4$ of greater than 100.

Embodiment 11

An adsorbent contactor for use in swing adsorption gas separation process units, comprising: a) a gas inlet end; and b) a gas outlet end; wherein the gas inlet end and the gas outlet end are in fluid connection by a plurality of open flow channels wherein the surface of the open flow channels are comprised of the adsorbent material of any one of the previous embodiments.

Embodiment 12

A gas separation process comprising contacting a gas mixture containing at least one contaminant with an adsorbent material of any one of embodiments 1-9.

Embodiment 13

The process of embodiment 12, wherein the gas mixture comprises $CH_4$ and the at least one contaminant is $CO_2$, $H_2O$, $H_2S$, $N_2$, $NO_x$ and $SO_x$.

Embodiment 14

The process of embodiment 12, wherein the gas mixture comprises olefinic and paraffinic gas and the at least one contaminant is the olefinic gas.

Embodiment 15

The process of any one of embodiments 12-13, wherein the process comprises PSA, TSA, PPSA, PTSA, RCPSA, RCTSA, RC-PPSA or RC-PTSA.

Embodiment 16

A process for selectively separating $CO_2$ from a feed gas mixture, the process comprising: a) contacting the feed gas mixture under sorption conditions with the adsorbent material of any one of embodiments 1-9; b) sorbing the $CO_2$ into/onto the sorbent; c) subjecting the sorbent to desorption conditions by which at least a portion of the sorbed $CO_2$ is desorbed; and d) retrieving a $CO_2$-rich product stream that has a higher mol % of $CO_2$ than the feed gas mixture.

Embodiment 17

The process of embodiment 15, wherein the feed gas mixture comprises $CH_4$.

Embodiment 18

The adsorbent material of any of embodiments 1-10, wherein the at least one coating has a diffusion coefficient for $CO_2$ of greater than 1.0 e-13 or greater than 1.0 e-11 under ambient conditions.

EXAMPLES

The following examples are merely illustrative, and do not limit this disclosure in any way.

Synthesis Examples

Example 1—Si-CHA/Sigma-1 (CHA/DDR)

Example 1A

A Sigma-1 synthesis gel was prepared using Ludox (HS-40), sodium hydroxide, sodium aluminate and 1-aminoadamantane as the structure directing agent (SDA) in the following molar ratios: ~58-60 $SiO_2$:$Al_2O_3$:~3.3 $Na_2O$:~20 AN:~1457-2360 $H_2O$. Specifically, 238.83 g of distilled water was added to a beaker followed by 1.7895 g of pellets of NaOH, 2.0913 g of sodium aluminate ($Al_2O_3$: 50-56%, $Na_2O$: 40-45%), 35.04 g of 1-aminoadamantane and 102.27 g of Ludox (HS-40). The mixture was stirred after each reagent addition to produce the gel.

Si-CHA crystals were used as the core material. In forming the Si-CHA crystals, the ~0.1 HCl:~0.5 HF:~0.5 SDAOH: $SiO_2$:~3 $H_2O$, where SDA is N,N,N-trimethyl-1-adamantammonium, was prepared by adding ~163.3 g of ~25 wt % SDAOH and ~25 g of precipitated silica (Evonik-Sipernat 340) to a clean plastic beaker and stirred for ~90 minutes. ~13.8 g of ~10% HCl solution was slowly added to the plastic beaker and stirred for ~10 more minutes. The resultant mixture was placed in a clean and tared stainless steel tray and then freeze dried to a weight of ~68.3 g. The dried gel was grinded with a mortar and pestle to a powder and then ~14 g of deionized water was added and mixed in with a spatula. A total of ~7.9 g of ~49 wt % HF was carefully added in four equal portions while mixing with a spatula for several minutes after each addition. The mixture was then thoroughly homogenized in a FlackTek Speed-Mixer, transferred to a 125 mL TEFLON-lined autoclave, and then crystallized for ~3 days at ~150° C. under static conditions. The product was recovered and washed with de-ionized water by vacuum filtration, and then dried in a ~115° C. oven resulting in Si-CHA crystals about 6-22 μm in size. The gel was divided into four 125 mL autoclave cups, and the Si-CHA core crystals were added in the following quantities:

Cup 1: 90.00 g gel‖3.4027 g Si-CHA
Cup 2: 90.03 g gel‖3.4056 g Si-CHA
Cup 3: 90.04 g gel‖3.4082 g Si-CHA
Cup 4: 90.23 g gel‖3.4032 g Si-CHA The autoclaves were sealed and placed into a tumbling oven at 180° C. for 28 hours and 40 RPM under autogenous conditions. After the reactors were cooled the solids were filtered and washed with distilled water until the wash water pH was equal to that of the distilled water. The solids were then dried at 105-120° C. to form Material 1A.

Alternately, some of these materials (Material 1A(i)) were grown in stirring autoclaves (FIG. 1) instead of tumbling ovens.

Figure 2:
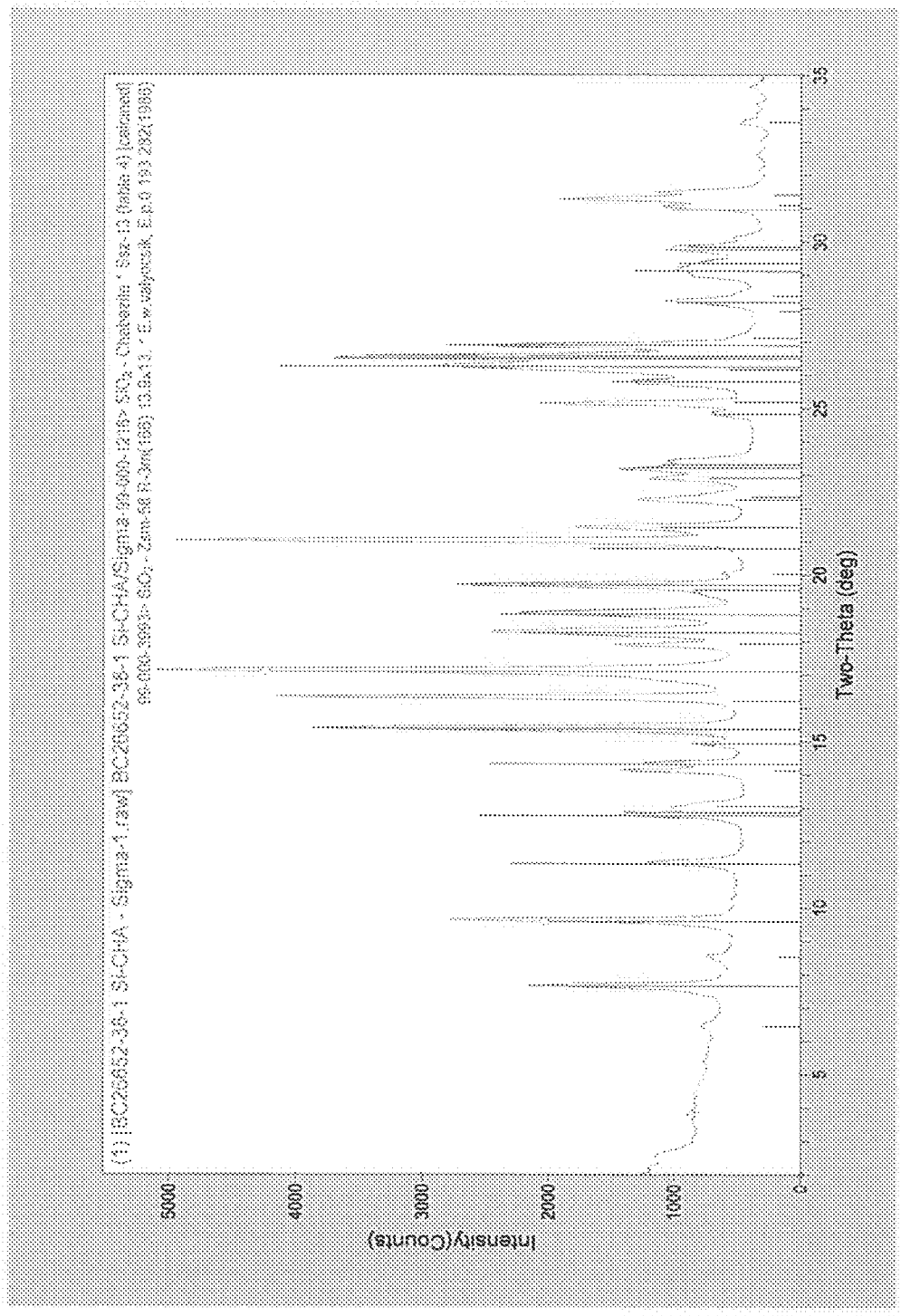
FIG. 2 illustrates a powder X-ray diffraction (PXRD) spectrum of core/shell crystals (Material 1A) from Example 1A, indicating the presence of the Si-CHA and DDR phases.
Figure 3:
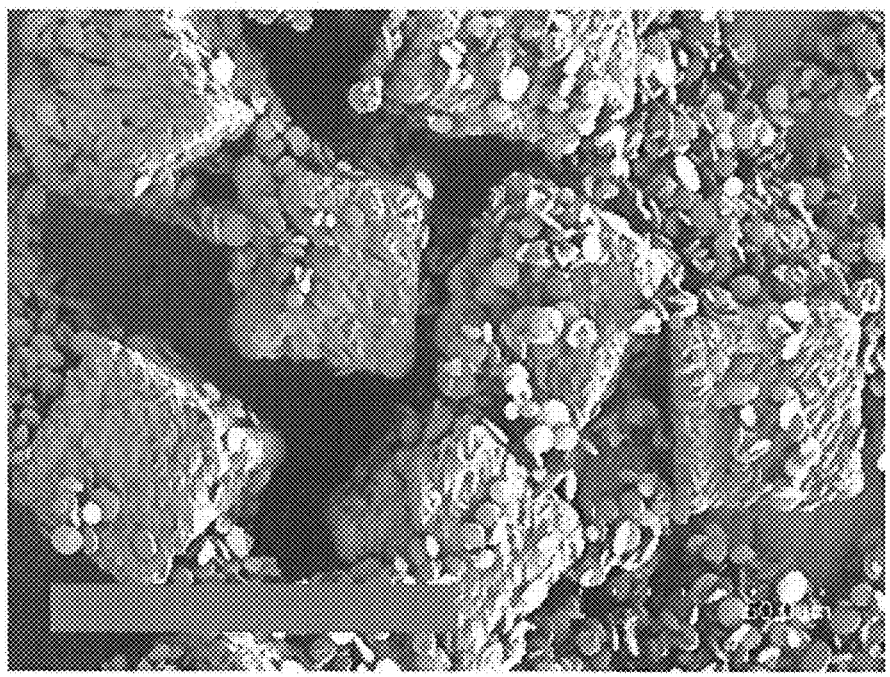
FIG. 3 shows a SEM of a Material 1A prepared in Example 1D showing the rhombohedral shape of the Si-CHA core coated with the oblate spheroidal shape of the DDR solids. Excess Sigma-1 can also be seen mixed with the core/shell solid.
Figure 4:
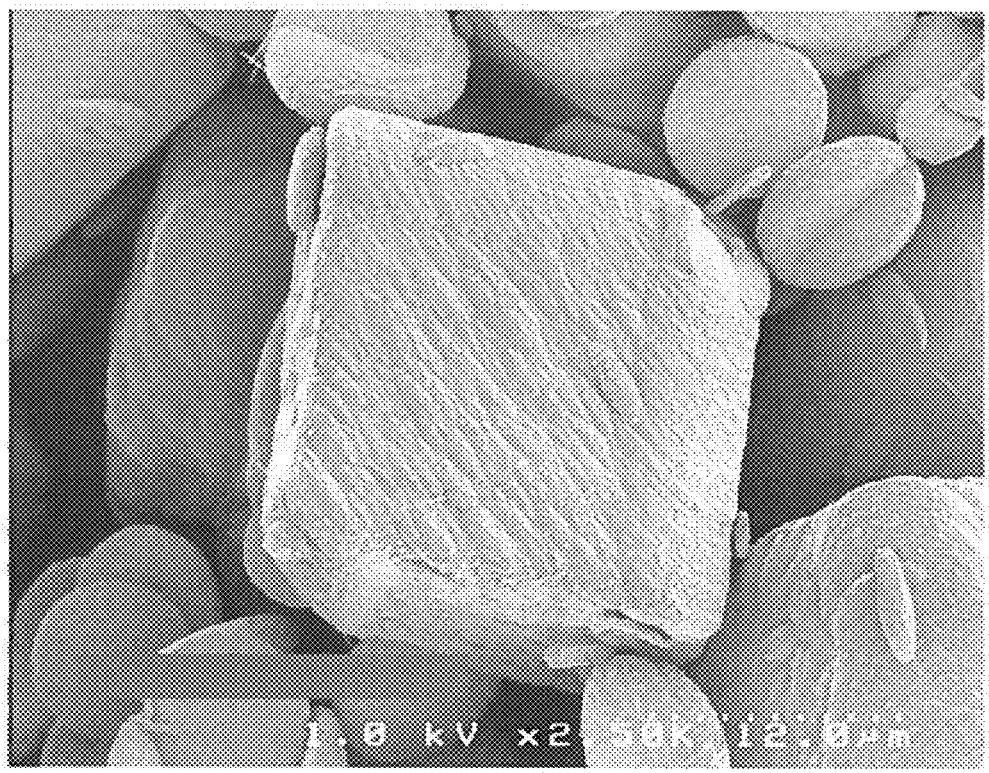
FIG. 4 shows a scanning electron microscope (SEM) image of a core/shell Si-CHA crystal as prepared in Example M.

Powder X-ray Diffraction (XRD) (FIG. 2) was performed on Material 1A and indicated the presence of both the Si-CHA and Sigma-1 phases. PXRD patterns were taken on the Bruker D4 Endeavor, and the Jade program was used in the identification of the crystalline phases. Scanning Electron Microscope (SEM) images (FIG. 3) were taken of Material 1A, which show rhombohedral crystals coated with multiple oblate spheroids as well as independent spheroid crystals of Sigma-1. SEM images were taken on the Hitachi S-4500 and the Hitachi S-4700.

Material 1A was calcined at ~115° C. for ~1 hour followed by a ~4 hour ramp to ~540° C. Material 1A was held at ~540° C. for ~4 hours then cooled to room temperature (~20-25° C.) in ~2 hours.

Example 1B

Figure 5:
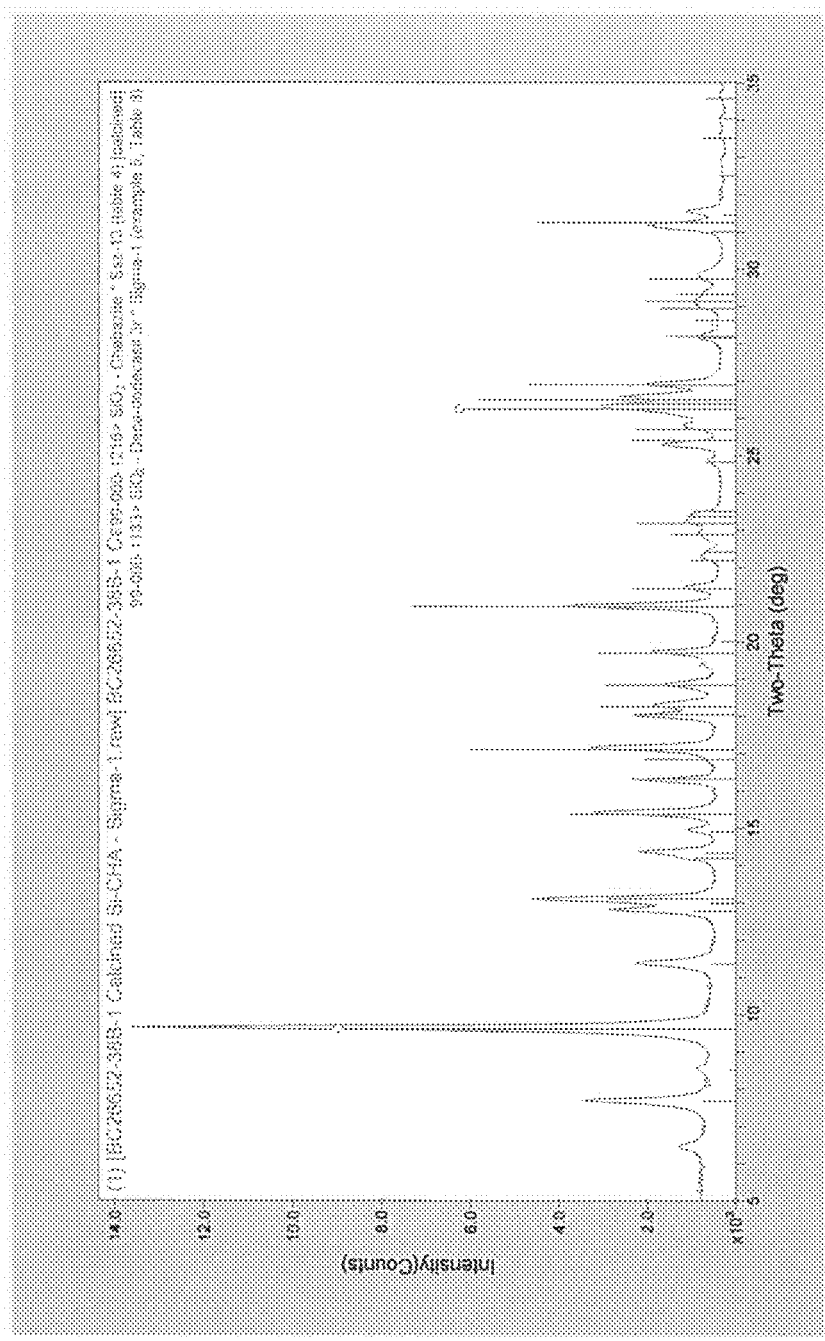
FIG. 5 illustrates PXRD spectrum for Material 1B prepared in Example 1B.

A synthesis gel was prepared in the same manner as Example 1A using the following molar ratios: ~60.35 $SiO_2$: ~1 $Al_2O_3$:~3.33 $Na_2O$:~20.54 AN:~1478.71 $H_2O$ and ~3.78 wt % core crystals were added to the gel. The core crystals were ~15 μm in size. The reaction was carried out under autogeneous conditions at ~180° C. and ~40 RPM in a tumbling oven for ~28 hours and Material 1B was obtained. As shown in FIG. 5, the powder XRD pattern of the Material 1B indicated the presence of both the Si-CHA and Sigma-1 phases. The work up, calcination, and characterization of the sample were the same as in Example 1A.

Example 1C

Figure 6:
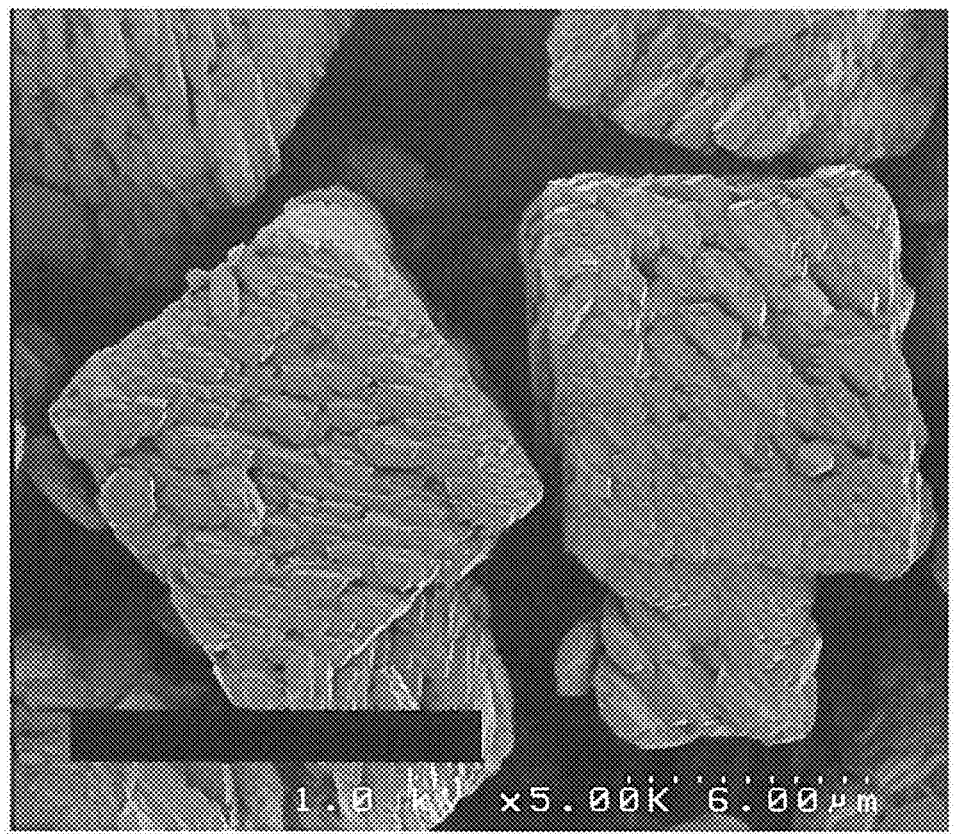
FIG. 6 illustrates a SEM image for Material 1C prepared in Example 1C.

A synthesis gel was prepared in the same manner as in Example 1A using the following molar ratios: ~59.88 $SiO_2$: ~1 $Al_2O_3$:~3.31 $Na_2O$:~20.38 AN:~1466.25 $H_2O$ and ~9.73 wt % core crystals were added to the gel. The core crystals were ~7 μm in size. The reaction was carried out under autogeneous conditions at ~180° C. and ~40 RPM in a tumbling oven for ~28 hours and Material 1C was obtained. As shown in FIG. 6, an SEM image of Material 1C prepared revealed cubic crystals coated with multiple oblate spheroids illustrating new growth on the core crystal. The work up, calcination, and characterization of the sample were the same as in Example 1A.

Example 1D

Figure 7:
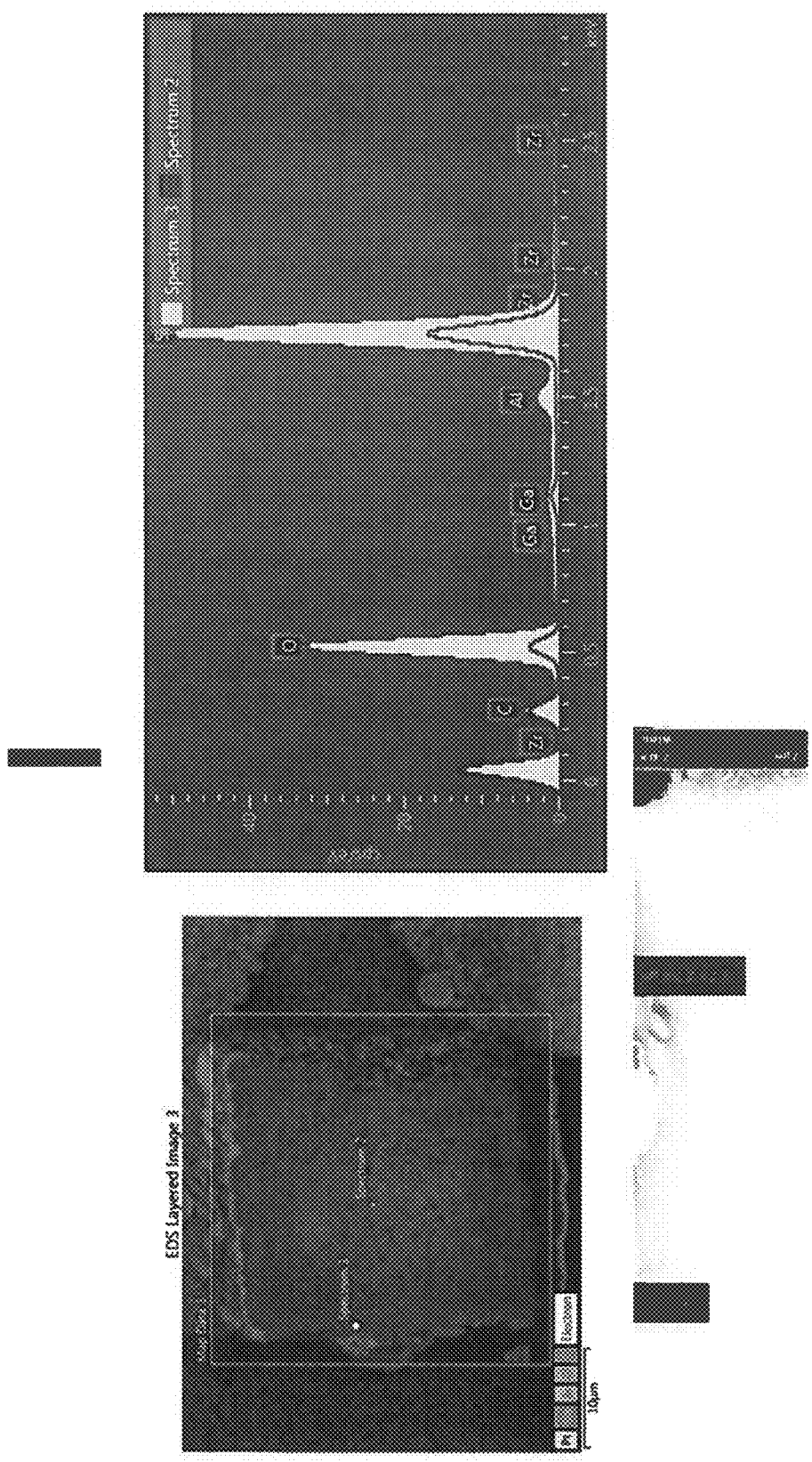
FIG. 7 illustrates a focused ion beam-scanning electron microscope (FIB-SEM) image of Material 1D from Example 1D where the Sigma-1 coating/shell frames the Si-CHA crystal.
Figure 8:
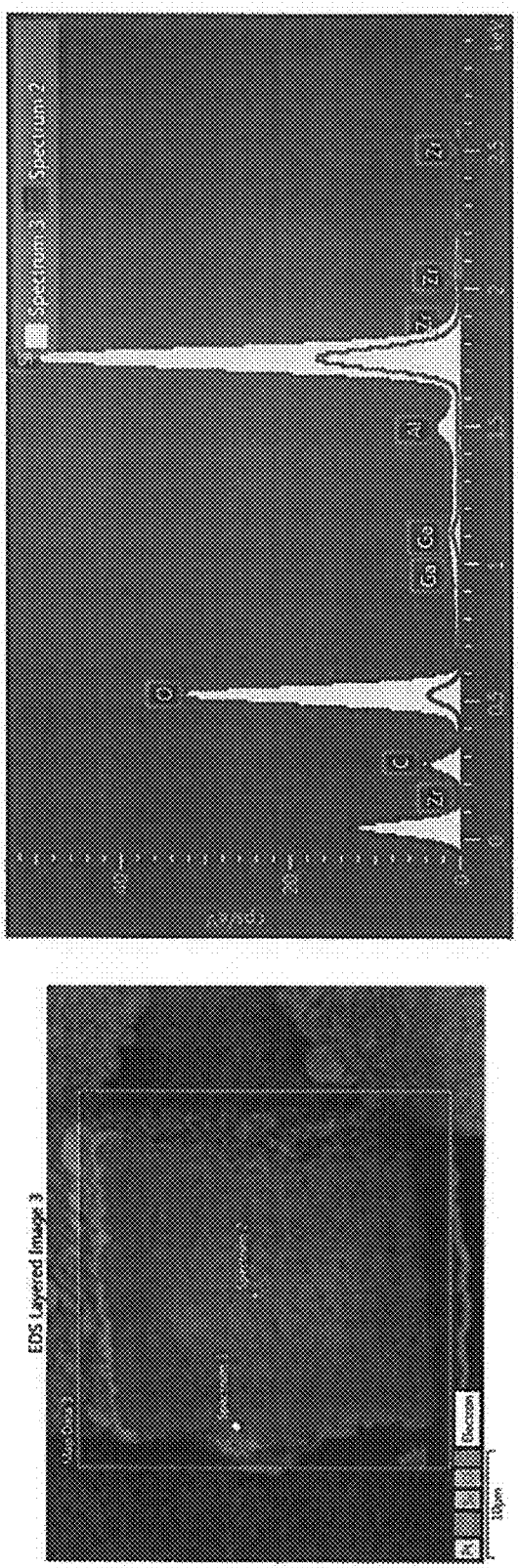
FIG. 8 illustrates an energy dispersive spectroscopy (EDS) spectrum 2 taken at the core of the Material 1D and spectrum 3 taken at the edge of the coating or shell of Material 1D from Example 1D.

A synthesis gel was prepared in the same manner as Example 1A using the following molar ratios: ~59.54 $SiO_2$: ~1 $Al_2O_3$:~3.35 $Na_2O$:~20.25 AN:~1457.24 $H_2O$ and ~4.20 wt % core crystals were added to the gel. The core crystals were ~18 μm in size. The reaction was carried out under autogeneous conditions at ~180° C. and ~40 RPM in a tumbling oven for ~28 hours and Material 1D was obtained. As shown in FIG. 7, the FIB-SEM image of Material 1D shows the Sigma-1 coating/shell framing the Si-CHA crystal core. As shown in FIG. 8, following performance of EDS on Material 1D, Spectrum 2, taken at the Si-CHA core, does not contain aluminum while Spectrum 3, taken at the coating, shows the presence of aluminum, thus, indicating the presence of two distinct crystalline phases in one crystal. The work up, calcination, and characterization of the sample were the same as in Example 1A.

Example 2: Si-CHA/Amorphous $SiO_2$

Figure 9:
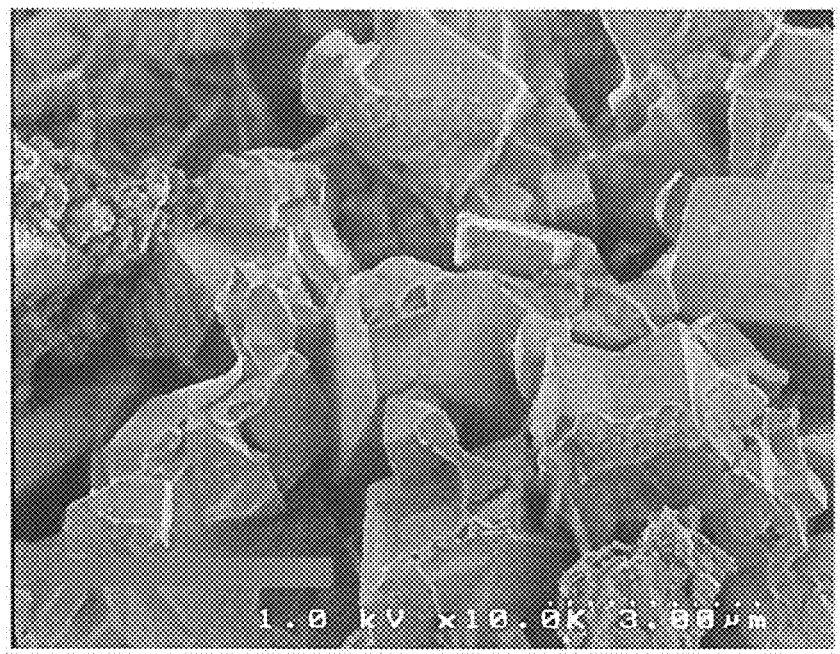
FIG. 9 illustrates an SEM image of Material 2 from Example 2.

Si-CHA was coated with amorphous $SiO_2$ as follows: 289.1 mg of Ludox (AS-40) was added to a beaker. Distilled water (779.5 mg) was added to the Ludox with mixing. Si-CHA (1.0007 g) was added to the Ludox/water mixture and stirred thoroughly. This mixture was left to dry overnight in air at room temperature. The mixture was calcined with a 1 hour ramp to 115° C., followed by a 1 hour hold at 115° C. The temperature was then raised over 4 hours to 540° C. and held at 540° C. for 4 hours. The sample was then cooled to 25° C. over 2 hours and Material 2 was obtained. FIG. 9 shows an SEM image of the Material 2.

Example 3: ZSM-58/Sigma-1 (DDR/DDR)

Figure 10:
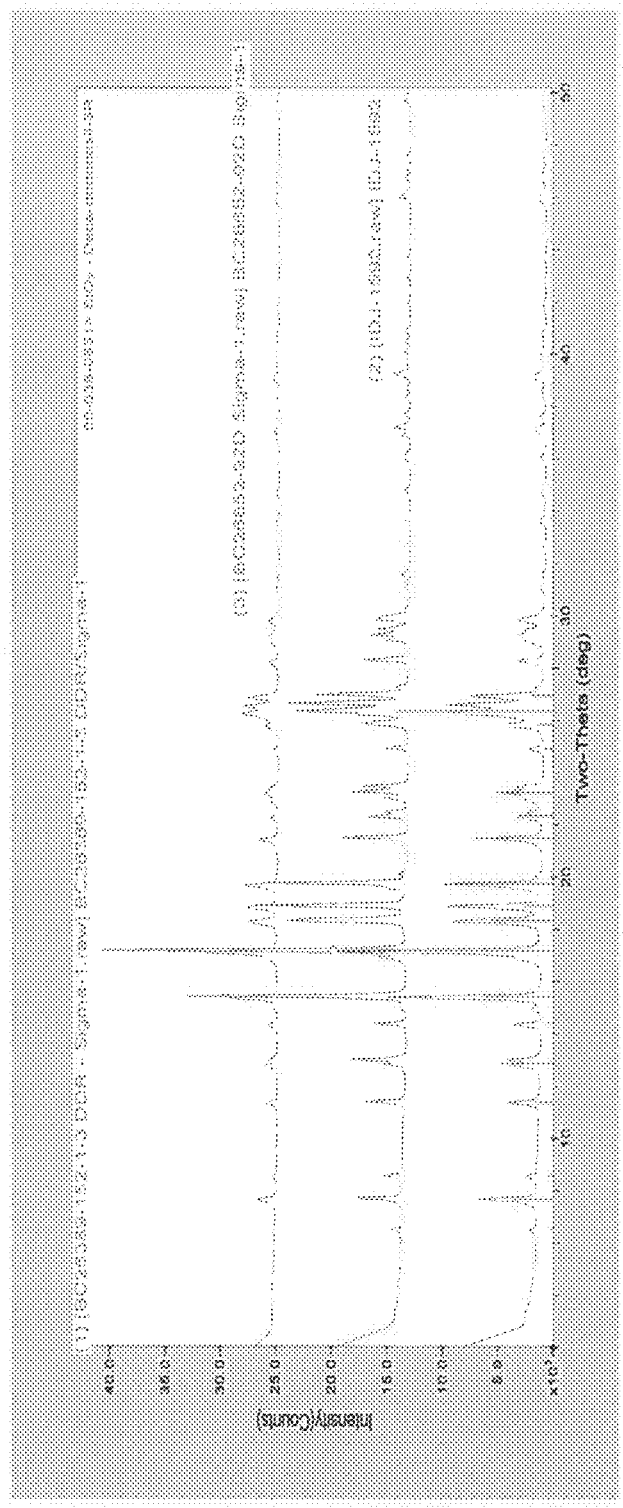
FIG. 10 illustrates a PXRD spectrum of Material 3 indicating the DDR framework structure for ZSM-58, Sigma-1, and the core/shell of ZSM-58/Sigma-1 from Example 3.

A Sigma-1 synthesis gel was prepared by adding 120.37 g of distilled water, 510 mg of NaOH, 600 mg of $NaAlO_2$, 9.93 g of 1-aminoadmantane, 28.58 g of Ludox (HS-40), and 10.0 g of ZSM-58 to a 300 mL stirring autoclave. ZSM-58 crystals have a smooth surface and were fabricated similarly to the formulation disclosed in U.S. Publication No. 2015/0182947, the teachings of which are incorporated herein by reference. The reaction ran at 180° C. for 28 hours at 500 RPM under autogenous conditions and Material 3 was obtained. Washing, filtering, and drying procedure were the same as in Example 1A above. The PXRD pattern of Material 3 in FIG. 10 shows the ZSM-58/Sigma-1 pattern on bottom, the ZSM-58 pattern in the middle, and a Sigma-1 pattern on top. All patterns are identical as they represent the DDR framework structure.

Figure 11:
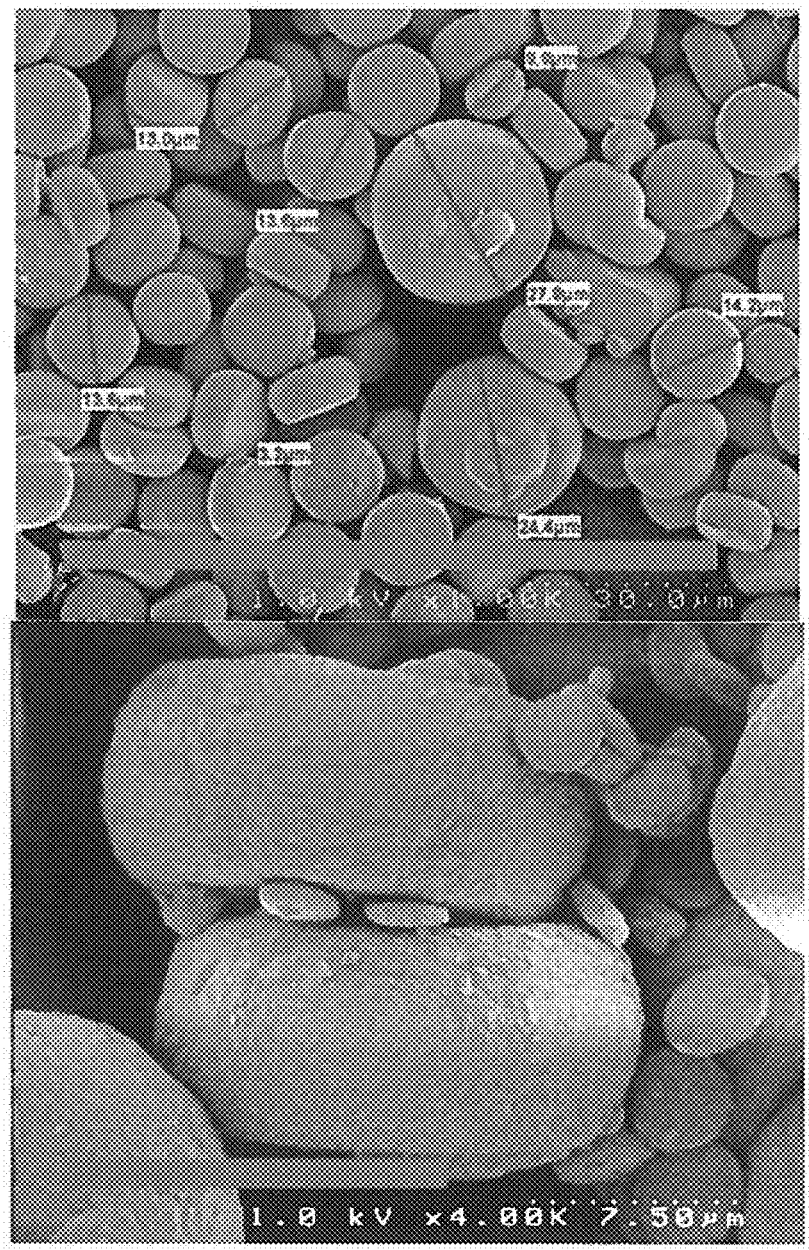
FIG. 11 illustrates SEM images of ZSM-58 uncoated zeolite crystal from Example 3 with "hockey-puck" morphology (top panel), and Material 3 with Sigma-1 coating ZSM-58 crystals (bottom panel).

In this case the SEM image is critical for identifying the two phases. The SEM image in FIG. 11 (bottom panel) of Material 3 shows the large hockey puck shaped crystals with a rough surface coating and areas with small oblate spheroids. The small oblate spheroids are the excess Sigma-1 crystals produced in the synthesis which uses 1-aminoadmantane as its SDA.

Example 4: ZSM-5/UZM-19 (MFI/CDO)

Reagents were added to a beaker in the following order: 1.13 parts deionized water; 1.0 part silica (Ludox™ AS-40); 0.360 parts tetrapropylammonium Br, (50% by weight solution); 0.0021 parts MFI seed crystals; 0.0300 parts sodium hydroxide (~50 wt % solution); 0.00472 parts sodium aluminate (available from Southern Ionics, 43 wt %). The reactant gel was crystallized at 150° C. for 24 hours in a stirred autoclave to yield ZSM-5 crystals.

Figure 12:
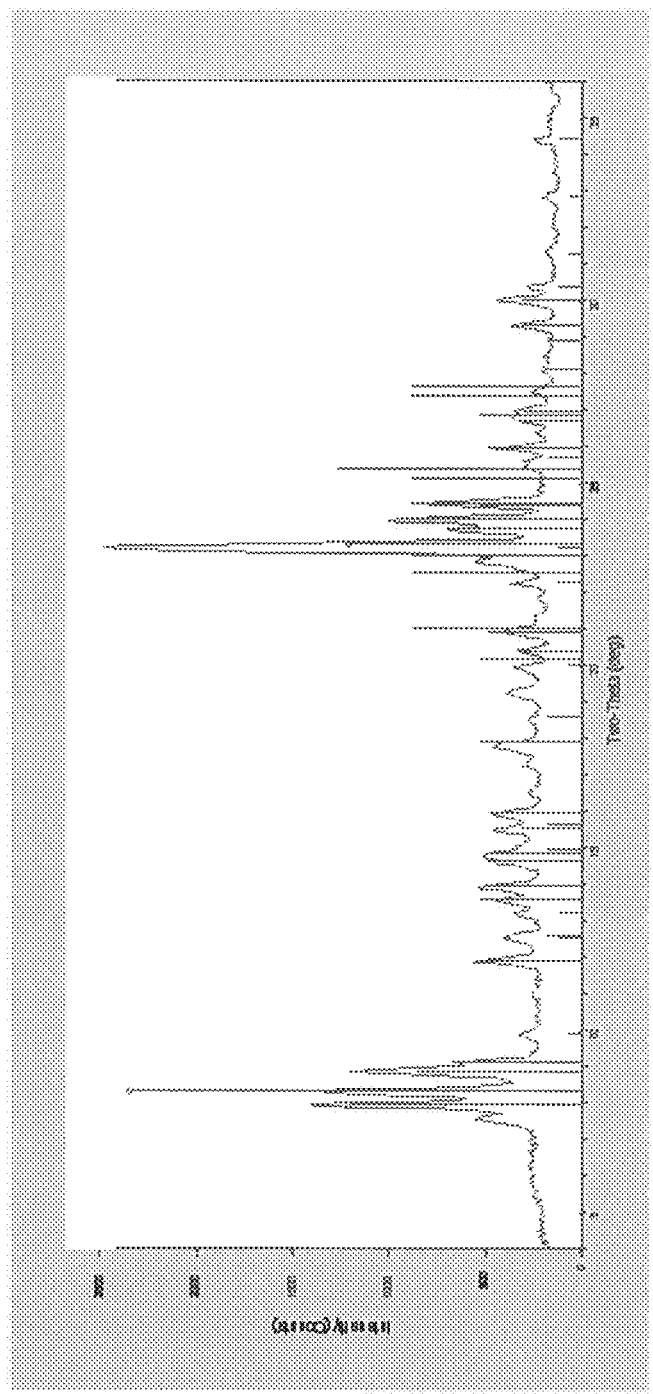
FIG. 12 illustrates a PXRD spectrum indicating the presence MFI and CDO in the Material 4 from Example 4. Several minor peaks represent an unidentified phase.
Figure 13:
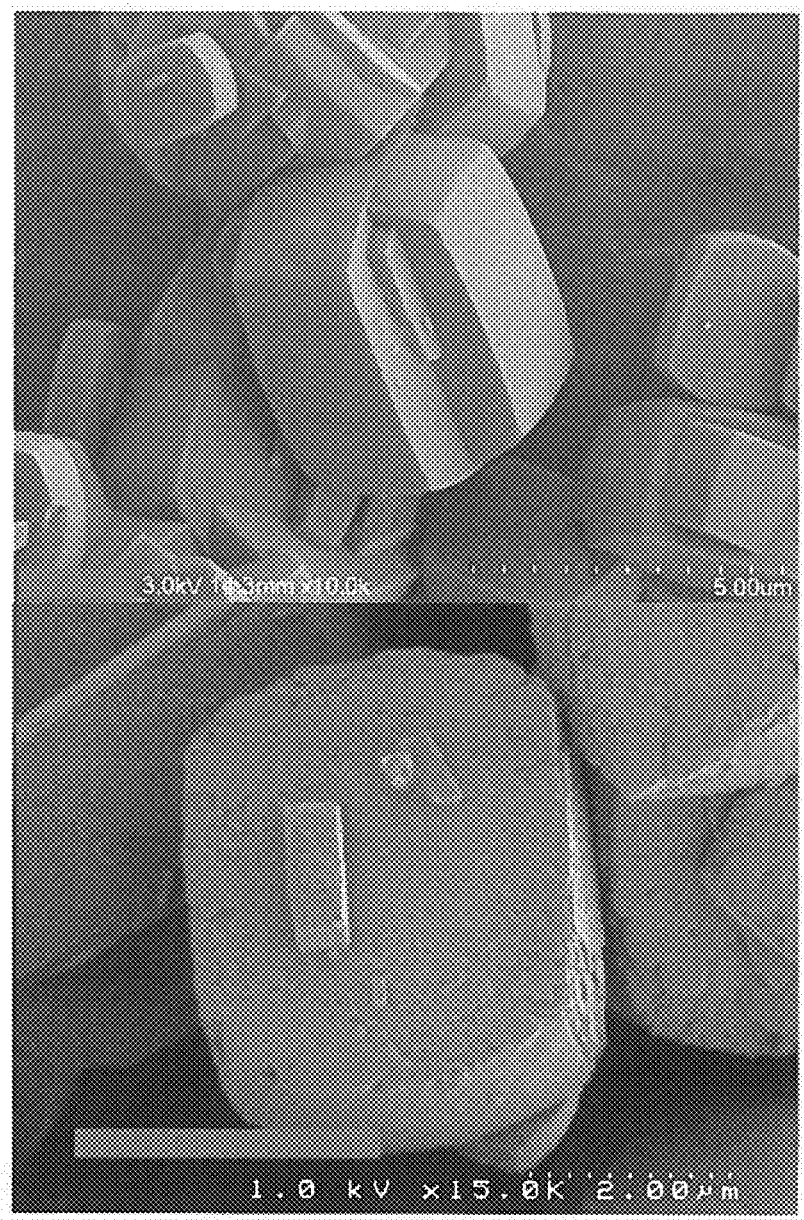
FIG. 13 illustrates an SEM image of MFI crystals as synthesized in Example 4 (top panel) and an SEM image of Material 4 illustrating the MFI core crystal with a solid coating over the crystal.

When ZSM-5 was added to a UZM-19 gel having a molar ratio of 1 $SiO_2$:0.15 NaCl: 0.26 butamethonium $(OH)_2$: 126.81 $H_2O$, the resulting crystals showed evidence of having the core shell structure. The reaction was carried out at 165° C. for 10 days under static conditions and Material 4 was obtained. Material 4 is shown in the PXRD pattern (FIG. 12) and SEM image (FIG. 13). Both the PXRD pattern and SEM image show the presence of the MFI and CDO phases. A coating can be seen on the core ZSM-5 crystal.

Example 5: Si-CHA/SSZ-39 (CHA/AEI)

Figure 14:
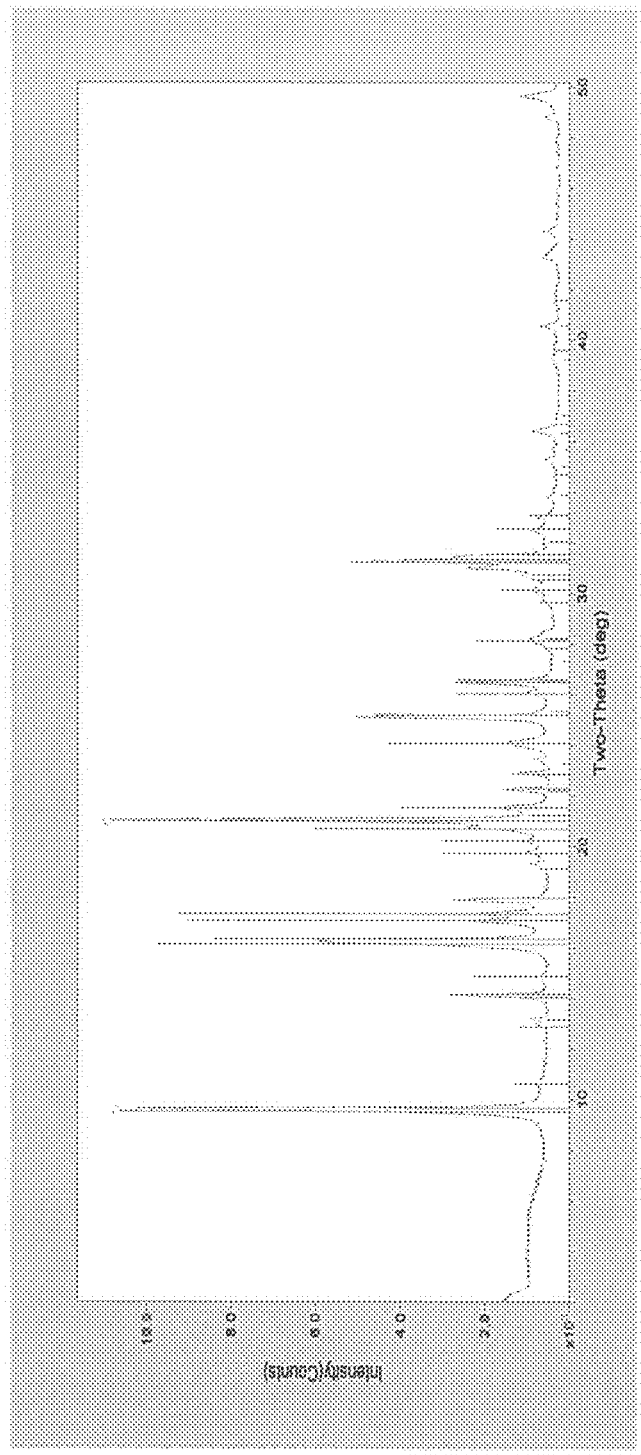
FIG. 14 illustrates a PXRD spectrum of Material 5 with CHA and SSZ-39 phases present prepared in Example 5.
Figure 15:
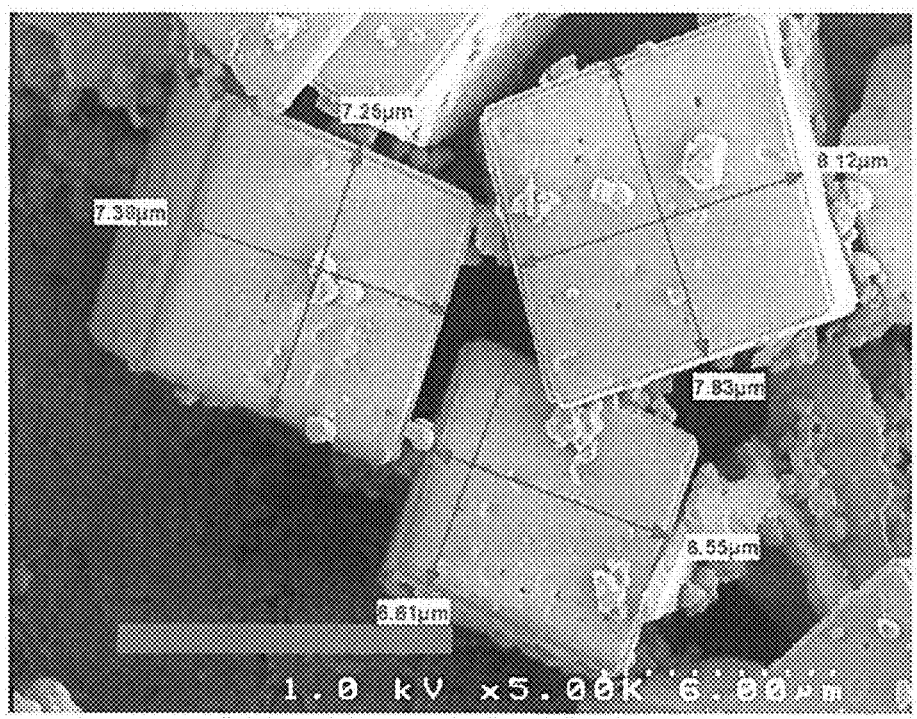
FIG. 15 shows a SEM image of Material 5 with rhombohedral Si-CHA crystal coated with a plate-like solid.

A gel of SSZ-39 was prepared by adding 4.3714 g of N,N-diethyl-cis-2,6-dimethylpiperidium hydroxide to a TEFLON cup. Distilled water (5.213 g), 247 mg of NaOH, 5.2627 g of sodium silicate solution (28.2% $SiO_2$, 9.26% NazO, 62.54% $H_2O$), 160.5 mg of EZ-190 (FAU, Ultra Stable Y: 60.2% $SiO_2$, 17.2% $Al_2O_3$, 0.06% Na, 22.54% $H_2O$), and 1.0559 g of Si-CHA core solids were added to the TEFLON cup. The cup and its contents were placed in an autoclave and reacted at 135° C. for 5 days in a tumbling oven at 40 RPM. The resulting solids were washed and filtered as previously described in Example 1A above and Material 5 was obtained. PXRD pattern (FIG. 14) and SEM image (FIG. 15) for Material 5 both show that both the CHA and AEI phases are present. The SEM image shows the rhombohedral morphology of the CHA with a surface SSZ-39 coating.

Example 6: ZSM-58/Dodecasil 1H (DDR/DOH)

Five DOH gels were prepared by adding 81.82 g of distilled water, 850 mg of 50% NaOH, 2.34 g of methyltropinium chloride, and 11.50 g of Ludox (HS-40). The gel was stirred overnight. Uncalcined ZSM-58 (10 g) was added to the digested gel in each of five TEFLON cups. The cups were then loaded into 125 mL autoclaves and reacted at 160°

Figure 16:
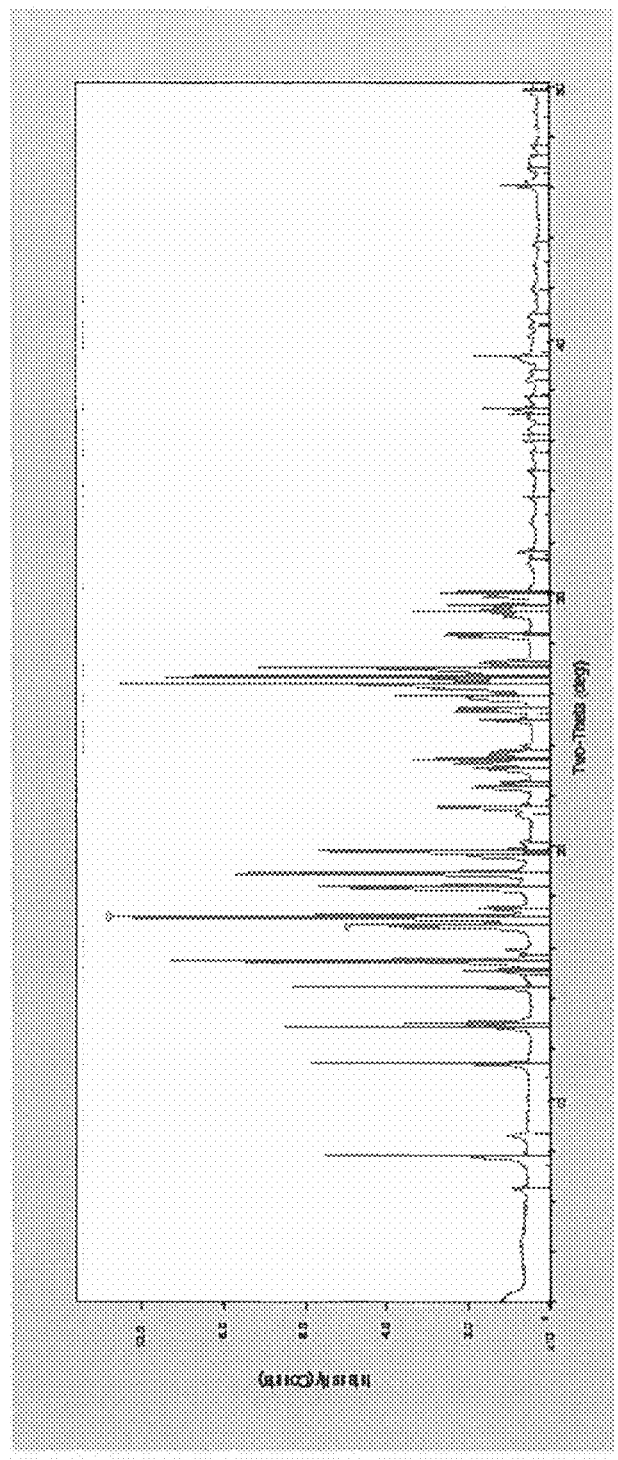
FIG. 16 illustrates a PXRD spectrum showing DDR and DOH phases of Material 6A prepared in Example 6.
Figure 17:
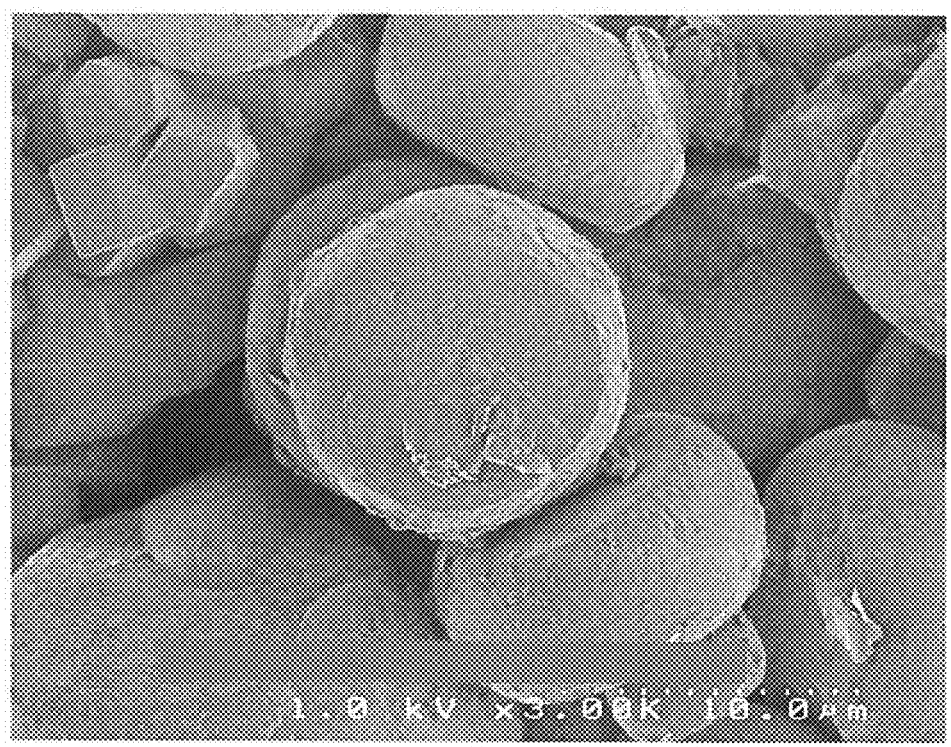
FIG. 17 shows a SEM image of an Example 6 ZSM-58 crystal coated with Sigma-1.

C. for 14, 28, 42, 56, and 70 hours respectively and Materials 6A, 6B, 6C, 6D and 6E were obtained, respectively. PXRDs of all five reactions showed both ZSM-58 and DOH phases. The PXRD pattern for Material 6A is shown in FIG. 16. The SEM images all showed ZSM-58 crystals that were coated in Sigma-1, as seen in FIG. 17. The uncoated ZSM-58 can be seen in FIG. 11 (top panel).

Figure 18:
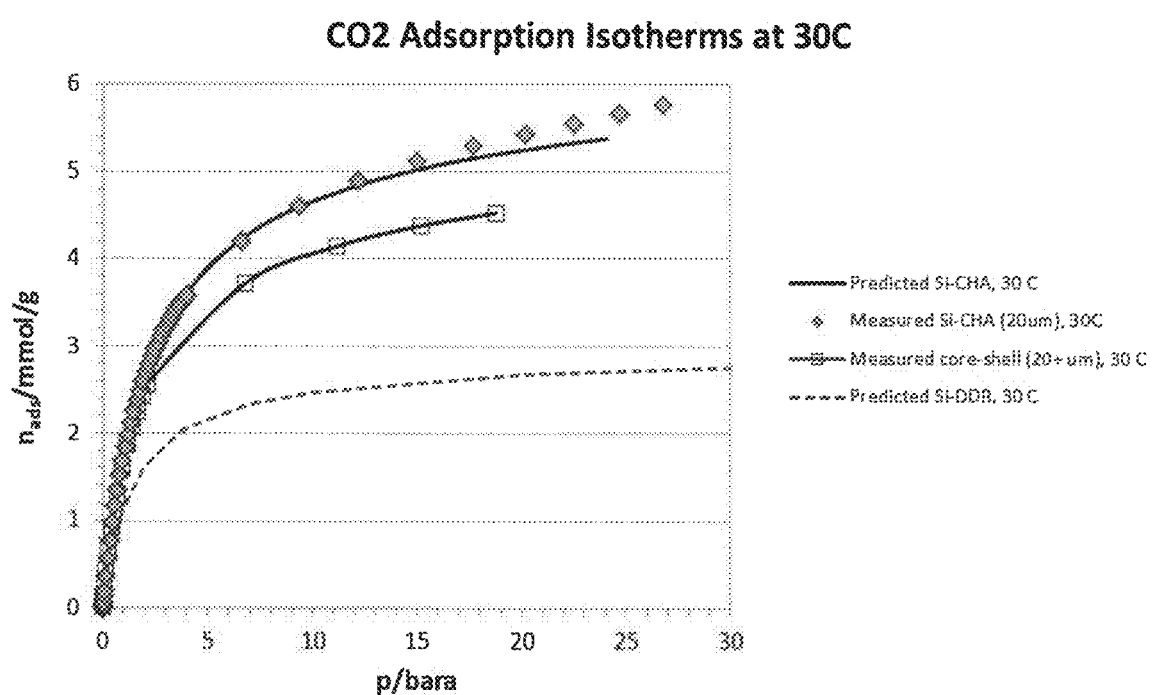
FIG. 18 illustrates $CO_2$ isotherms for Material 1D tested in Example 7 and the pure silica CHA crystals at 30° C.
Figure 19:
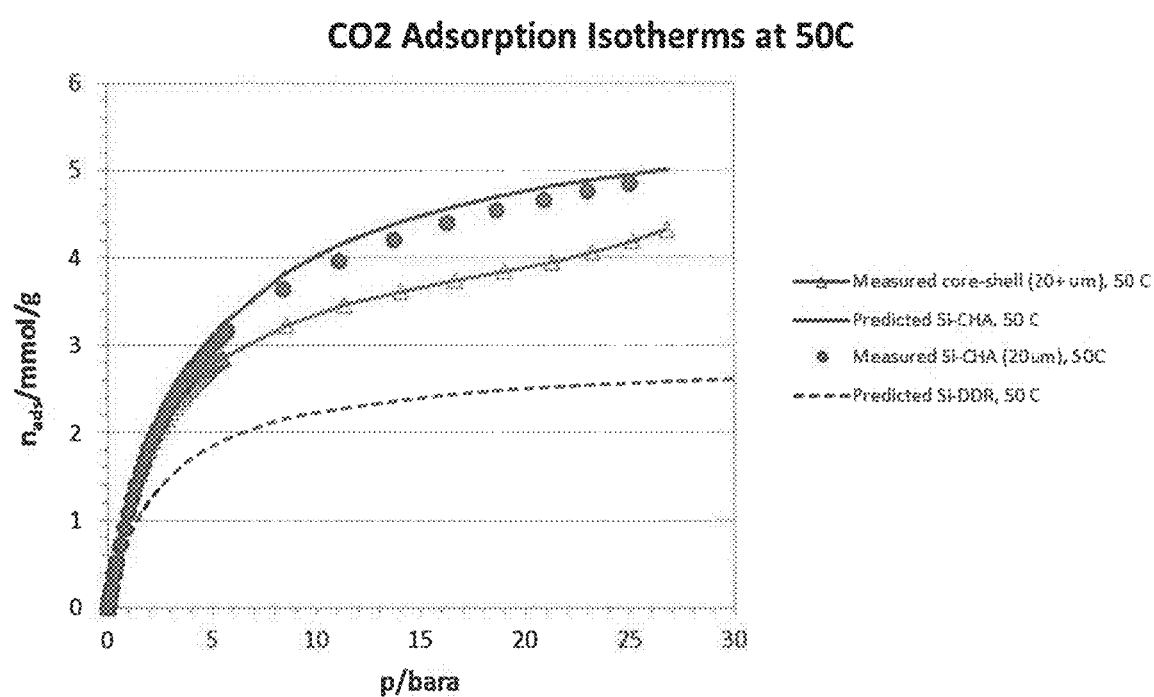
FIG. 19 illustrates $CO_2$ isotherms for Material 1D tested in Example 7 and the pure silica CHA crystals at 50° C.

Example 7: $CO_2$ Capacity $CO_2$ capacity of pure CHA and core-shell Si-CHA/DDR Materials 1A, 1B, 1C, and 1D was measured using a volumetric adsorption apparatus. High pressure adsorption isotherms of $CO_2$ were measured at ~30° C. and ~50° C. Isotherms were corrected from excess $N_{ex}$ to absolute $N_{abs}$ adsorption using the following formula:

$$N_{abs} = N_{ex} + \rho * V_{mi} \quad (1)$$

where $\rho$ is the gas density, and $V_{mi}$ is the micropore volume of the material. Pore volumes of pure Si-CHA and pure DDR were determined from $N_2$ adsorption measurements as 0.3 $cm^3/g$ and 0.17 $cm^3/g$, respectively. The micropore volumes for the core-shell materials were calculated based on the thickness of the shell and core obtained from SEM imaging. Swing capacity was assessed as the difference between the amounts adsorbed between ~10 bar and ~1 bar. The $CO_2$ isotherms for Material 1D and the pure Si-CHA crystals at ~30° C. are shown in FIG. 18. The $CO_2$ isotherms for Material 1D and the pure Si-CHA crystals at ~50° C. are shown in FIG. 19. The predicted silica CHA isotherms are also shown.

The adsorption isotherms on pure silica CHA and DDR were predicted using Grand Canonical Monte Carlo (GCMC) simulations. The molecular model for the $CO_2$ molecule was taken from J. J. Potoff, J. I. Siepmann, *AIChE Journal*, 47 (2001), 1676. Interactions with the zeolite framework were used as described in O. Talu, A. L. Myers, *Colloids and Surfaces A: Physicochem. Eng. Aspects* 187-88 (2001) 83, using Lorentz-Berthelot combining rules. Charges on the zeolite framework were Si(+2) and O(-1). The predicted silica CHA isotherms are in good agreement with excellental ones. As shown in FIGS. 18 and 19, Material 1D has a lower adsorption capacity than pure Si-CHA due to lower adsorption capacity of the DDR shell as compare to silica CHA, but significantly higher adsorption capacity than pure silica DDR. This confirms that the synthesized core-shell material has significantly improved adsorption capacity as compared to pure silica DDR.

Example 8: Diffusivity

Diffusivity measurements were performed to determine $CH_4$ and $CO_2$ transport diffusion coefficients in parent and core-shell materials. $CH_4$ diffusivities were obtained by Zero Length Chromatography (ZLC), Frequency Response (FR), as well as by breakthrough measurements with small columns. Techniques to measure diffusivities are described in (e.g.) J. Karger, D. M. Ruthven, D. N. Theodorou, "Diffusion in Nanoporous Materials", Wiley-WCH, 2012. For ZLC measurements between about 7 to 30 mg of sample was loaded into the sample cell and reference cell. The sample was outgassed for ~2 hours at ~200° C. in a flow of ~100% helium at a flow rate of ~10 mL/min to remove physisorbed water from the sample. Subsequently, the sample was exposed to a flow of ~10% methane in helium at ~10 mL/min for ~1-2 hours at ~30° C. During this period the sorbate methane was adsorbed by the sample. The total pressure in the sample line was stabilized at ~1.70 bar (~10 psig), and the pressure difference between the sample and reference line was reduced to ~1 mbar. The methane concentration during the ZLC experiment was detected by mass spectrometry (m/e≈16). Upon switching to helium flow in the sample line, the methane was purged from the sample line and the sample cell resulting in a decline in methane signal detected by the mass spectrometer. The methane signal reached the baseline in about 5 minutes after the first valve switch. Equation 1 describes the relationship between $c(t)/c(0)$ as a function of parameters L, $\beta$, D and R:

$$\ln\left(\frac{c(t)}{c0}\right) = \ln\left(2L \sum_{n=1}^{\infty} \frac{(-\beta_n^2 Dt/R^2)}{[\beta_n^2 + L(L-1)]}\right) \quad (2)$$

where $c(t)$ represents the concentration of the sorbate at time t; $c(0)$ represents the initial concentration of the sorbate; D represents the sorbate diffusivity; R represents the crystal radius; and $\beta_n$ is given by the roots of $$\beta_n \cot \beta_n + L - 1 = 0 \quad (3)$$

and parameter L is defined as:

$$L = \frac{FR^2}{3KVD} \quad (4)$$

where F represents the flow rate of the sorbate gas; K represents Henry's constant; V represents the sample volume; and D and R are the same as in equation 2. Equations 2 and 3 are solved numerically using MATLAB, and the values for L, and $D/R^2$ were obtained from a least square fit of the experimental curve.

In a variation of the ZLC technique in which the time allowed for the saturation of the sample is shorter or comparable to the diffusion time, a different mathematical model should be used. Extended equations are described in (e.g.) S. Brandani and D. M. Ruthven, "Analysis of ZLC Desorption Curves for Gaseous Sytems", *Adsorption* 2, 133-43 (1996).

In another variation of the ZLC technique the uptake curve rather than the desorption curve can be analyzed. In this case, the uptake $c/c_0$ curve is converted to the amount adsorbed $q/q_0$ by the sample using the mass-balance equation:

$$\frac{q}{q_0} = \frac{\int_0^t (1 - c/c_0) dt}{\int_0^\infty (1 - c/c_0) dt} \quad (5)$$

The uptake curve can be anaylsed using known methods for analyzing adsorption uptake as described in, e.g. J. Karger, D. M. Ruthven, D. N. Theodorou, "Diffusion in Nanoporous Materials", Wiley-WCH, 2012. In particular, for the micropore diffusion process the uptake is proportional to $\sqrt{t}$.

For fast $CO_2$ diffusivity measurements, we used a variation of the chromatographic breakthrough technique. This measurements were conducted in ambient conditions, i.e. between 25-40° C. and low concentrations—i.e. less than 25% saturation capacity or less than 50% saturation capacity. In these measurements a small amount of sample was placed in the adsorption bed of about ~1 cm in length. A mass-spectrometer with a fast data acquisition was used to collect the effluent concentration. A breakthrough profile indicates fast equilibration on a millisecond time scale. The method of moments (see, e.g.) J. Karger, D. M. Ruthven, D. N. Theodorou, "Diffusion in Nanoporous Materials", Wiley-WCH, 2012) can be used to extract the mass transfer resistance from such chromatographic measurements. The analysis indicates that the micropore resistance is the dominating mechanism, which the axial dispersion being negligible at such experimental conditions. One of the methods to extract diffusivities at such conditions is the so-called "long-column" approximation.

$$\frac{c}{c_0} = \frac{1}{2} \text{erfc}\left(\frac{\xi - \tau}{2\sqrt{\xi}}\right) \quad (6)$$

with parameters $$\xi = \frac{15D}{R^2} \frac{Kz}{v}\left(\frac{1-\varepsilon}{\varepsilon}\right), \quad (7)$$

$$\tau = \frac{15D}{R^2}(t - z/v)$$

where v is the gas velocity, $\varepsilon$ is the bed porosity and z is the distance along the bed.

The Frequency Response technique to measure the kinetic diffusion coefficient has been described by Reyes et al in "Frequency Modulation Methods for Diffusion and Adsorption Measurements in Porous Solids", J. Phys. Chem. B. 101, pages 614-22, 1997. In this technique the sample cell is subjected to small periodic modulations in volume that change pressure and cause adsorption/desorption process in the sample. A range of frequencies is scanned, and the response of the system is monitored in terms of the response functions. The kinetics of $CH_4$ adsorption has been derived assuming the micropore diffusional resistance model.

Table 1 below shows the diffusivities and selectivity data for pure DDR and CHA and for the core/shell materials.

particular, the kinetic selectivity of the Si-DDR/sigma-1 material increases approximately three fold compare to parent Si-DDR material. The kinetic selectivity of the core-shell Si-CHA/sigma-1 materials increases by approximately 3-7 times compare to parent Si-CHA.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. An adsorbent material comprising
    a porous, solid core, wherein the core has a volume adsorptive capacity of less than 35% of the volume of the adsorbent material and
    at least one coating on the core, wherein the at least one coating has a kinetic selectivity for $CO_2$ over $CH_4$ of greater than 10.
2. The adsorbent material of claim 1, wherein the core comprises a zeolite.
3. The adsorbent material of claim 2, wherein the zeolite comprises chabasite (CHA).
4. The adsorbent material of claim 3, wherein CHA is selected from the group consisting of Si-CHA, SAPO-34, AlPO-34, SSZ-13 and a combination thereof.
5. The adsorbent material of claim 1, wherein the at least one coating comprises a zeolite.
6. The adsorbent material of claim 5, wherein the zeolite comprises DDR.
7. The adsorbent material of claim 6, wherein DDR is selected from the group consisting of Sigma-1, ZSM-58 and a combination thereof.

TABLE 1

Diffusivity and selectivity for DDR and CHA core/shell materials

| Material (Core/Shell) | Material | Crystal Size | $CO_2$ adsorption at 10 bar, 30° C. (mmol/g) | $CO_2$ Diffusion D $CO_2$ (m²/s) | $CH_4$ Diffusion D $CH_4$ (m²/s) | D $CO_2$ ÷ D $CH_4$ |
|---|---|---|---|---|---|---|
| Si-DDR | Parent | 17 | 2.5 | 4.8e−10 | 8.9e−13 | 540 |
| Si-DDR/sigma-1 | Core/shell | 17 | | 2.3e−10 | 1.5e−13 | 1530 |
| Si/CHA | Parent | 20 | 4.85 | 8.2e−10 | 1.7e−11 | 50 |
| Sigma-1 | Pure | 8 | | >1.0e−10 | 1.0e−13 | >1000 |
| Sigma-1 | Pure | 4 | | >1.0e−11 | 1.8e−13 | >200 |
| Si-CHA/sigma-1 (Material 1C) | Core/shell | 9 | 3 | 1.9e−10 | 7.4e−13 | 270 |
| Si-CHA/sigma-1 (Material 1C) | Core/shell | 9 | 3.6 | 1.4e−10 | 6.0e−13 | 230 |
| Si-CHA/sigma-1 (Material 1D) | Core/shell | 20 | 4.0 | 6.9e−10 | 1.9e−12 | 360 |
| Si-CHA/sigma-1 (Material 1D) | Core/shell | 20 | 3.3 | 3.1e−10 | 2.0e−12 | 160 |

As shown in Table 1, the Si-DDR/sigma-1 core-shell material has higher $CO_2/CH_4$ kinetic selectivity than pure Si-DDR. Also the Si-CHA/sigma-1 core/shell materials have higher $CO_2/CH_4$ kinetic selectivity than pure Si-CHA. In 8. The adsorbent material of claim 1, wherein the core comprises Si-CHA and the at least one coating comprises Sigma-1.

9. The adsorbent material of claim 1, wherein the at least one coating and the core are present in a weight ratio of coating to core of about 6:1 to about 30:1.

10. The adsorbent material of claim 1, wherein the at least one coating and the core are present in a weight ratio of coating to core of about 1:1.

11. The adsorbent material of claim 1, wherein the adsorbent material is in the form of particles having an average particle size from about 2 µm to about 20 µm.

12. An adsorbent material comprising
a core comprising CHA and at least one coating on the core, wherein the coating comprises DDR.

13. The adsorbent material of claim 12, wherein the core has a volume adsorptive capacity of less than 35% of the volume of the adsorbent material.

14. The adsorbent material of claim 12, wherein the at least one coating has a kinetic selectivity for $CO_2$ over $CH_4$ of greater than 50.

15. The adsorbent material of claim 12, wherein CHA is Si-CHA and DDR is Sigma-1.

16. The absorbent material of claim 1, wherein the core is CHA and the coating is Sigma-1.

17. The adsorbent material of claim 1, wherein the core is CHA and the coating is $SiO_2$.

18. The adsorbent material of claim 1, wherein the core is ZSM-58 and the coating is Sigma-1.

19. The adsorbent material of claim 1, wherein the core is CHA and the coating is ZSM-58.

20. The adsorbent material of claim 1, wherein the core is ZSM-5 and the coating is UZM-19.

21. The adsorbent material of claim 1, wherein the core is CHA and the coating is AEI.

22. The adsorbent material of claim 1, wherein the core is DDR and the coating is DOH.

23. An adsorbent contactor for use in swing adsorption gas separation process units, comprising: a) a gas inlet end; and b) a gas outlet end; wherein the gas inlet end and the gas outlet end are in fluid connection by a plurality of open flow channels wherein the surface of the open flow channels are comprised of the adsorbent material of claim 1.

24. A gas separation process comprising contacting a gas mixture containing at least one contaminant with an adsorbent material of claim 1.

25. The process of claim 24, wherein the gas mixture comprises $CH_4$ and the at least one contaminant is one of $CO_2$, $N_2$, $H_2O$, $H_2S$, $NO_x$ and $SO_x$.

26. The process of claim 24, wherein the gas mixture comprises olefinic and paraffinic gas and the at least one contaminant is the olefinic gas.

27. The process of claim 24, wherein the process comprises PSA, TSA, PPSA, PTSA, RCPSA, RCTSA, RC-PPSA or RC-PTSA.

28. A process for selectively separating $CO_2$ from a feed gas mixture, the process comprising:
a) contacting the feed gas mixture under sorption conditions with the adsorbent material of claim 1;
b) sorbing the $CO_2$ into/onto the sorbent;
c) subjecting the sorbent to desorption conditions by which at least a portion of the sorbed $CO_2$ is desorbed; and
d) retrieving a $CO_2$-rich product stream that has a higher mol % of $CO_2$ than the feed gas mixture.

29. The process of claim 28, wherein the feed gas mixture comprises $CH_4$.

30. The adsorbent material of claim 1, wherein the at least one coating has a diffusion coefficient for $CO_2$ of greater than 1.0 e-13 $m^2$/s under ambient conditions.

31. The adsorbent material of claim 30, wherein the at least one coating has a diffusion coefficient for $CO_2$ of greater than 1.0 e-11 $m^2$/s under ambient conditions.

* * * * *